United States Patent
Shimada et al.

(10) Patent No.: US 11,782,603 B2
(45) Date of Patent: Oct. 10, 2023

(54) OPTIMIZED COMMUNICATON IN STORAGE SYSTEM

(71) Applicant: Hitachi, Ltd., Tokyo (JP)

(72) Inventors: Kentaro Shimada, Tokyo (JP); Takashi Nagao, Tokyo (JP); Naoya Okada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/690,965

(22) Filed: Mar. 9, 2022

(65) Prior Publication Data

US 2023/0075635 A1  Mar. 9, 2023

(30) Foreign Application Priority Data

Sep. 7, 2021 (JP) .................................. 2021-145334

(51) Int. Cl.
*G06F 3/06* (2006.01)
(52) U.S. Cl.
CPC .......... *G06F 3/0613* (2013.01); *G06F 3/0655* (2013.01); *G06F 3/0679* (2013.01)

(58) Field of Classification Search
CPC .... G06F 3/0613; G06F 3/0655; G06F 3/0679; G06F 2209/509; G06F 9/5027
See application file for complete search history.

(56) References Cited

U.S. PATENT DOCUMENTS

| 8,700,856 B2 | 4/2014 | Tanaka et al. |
| 2017/0214774 A1* | 7/2017 | Chen ..................... G06F 13/385 |
| 2018/0267707 A1* | 9/2018 | Barzik .................. G06F 3/0658 |

* cited by examiner

*Primary Examiner* — Jane W Benner
(74) *Attorney, Agent, or Firm* — Procopio, Cory, Hargreaves & Savitch LLP

(57) ABSTRACT

A bandwidth between a second processor and a second memory is higher than a bandwidth between a first processor and a first memory. The first memory stores a read command from a host computer. The first processor analyzes a content of the read command, and in accordance with a result of the analysis, requests read data from the second processor. In response to the request from the first processor, the second processor reads the read data from one or more storage drives and stores the read data in the second memory. The second processor notifies the first processor that the read data is stored in the second memory. The first processor transfers the read data read from the second memory, to the host computer without storing the read data in the first memory.

12 Claims, 16 Drawing Sheets

SMALL CPU

LARGE CPU

OPTIMIZED COMMUNICATON IN STORAGE SYSTEM

CLAIM OF PRIORITY

The present application claims priority from Japanese patent application JP 2021-145334 filed on Sep. 7, 2021, the content of which is hereby incorporated by reference into this application.

BACKGROUND OF THE INVENTION

1. Field of the Invention

The present invention relates to a storage system.

2. Description of the Related Art

The background art of the present disclosure includes, for example, U.S. Pat. No. 8,700,856 disclosing an example in which a storage system is configured using one type of central processing unit (CPU). More specifically, it discloses that "According to the storage subsystem of the present invention, a packet redirector having applied a non-transparent bridge enables to adopt a PCI Express multicast to the writing of data from the processor to the main memory, so that the order of writing data into the shared memories can be made consistent among the mirrored memories. As a result, data can be read from the shared memories speedily by accessing respective main memories in the respective processors." (Abstract).

SUMMARY OF THE INVENTION

The performance of a CPU depends on core performance and a memory bandwidth. The core performance of the CPU indicates computing performance, and increases as the computing performance of one core or the number of cores increases. The memory bandwidth indicates the access performance of access to an external memory storing data processed by the CPU, and increases as the performance of a memory control circuit mounted increases.

There has been a demand for higher performance of the storage system. The processing of the CPU in the storage system includes processing requiring high computing performance and processing requiring a high memory bandwidth for processing a large amount of data. Thus, a CPU having both high computing performance and a high memory bandwidth is required for a configuration in which one type of CPU executes processing in a controller of the storage system.

However, a CPU having high computing performance and a high memory bandwidth requires a large amount of complicated electronic circuit implementing the CPU, and thus in a case where the CPU is mounted on a semiconductor chip such as a large scale integrated circuit (LSI), the semiconductor chip has an increased area, leading to reduced manufacturing efficiency. Consequently, desirably, a more efficient configuration is used to implement performance required for the storage system.

An aspect of the present invention provides a storage system in communication with a host computer, the storage system including a first processor, a first memory connected to the first processor, a second processor, a second memory connected to the second processor, and one or more storage drives. A bandwidth between the second processor and the second memory is higher than a bandwidth between the first processor and the first memory. The first memory stores a read command from the host computer. The first processor analyzes a content of the read command, and in accordance with a result of the analysis, requests read data to the second processor. In accordance with the request from the first processor, the second processor reads the read data from the one or more storage drives and stores the read data in the second memory. The second processor notifies the first processor that the read data is stored in the second memory. The first processor transfers the read data read from the second memory, to the host computer without storing the read data in the first memory.

Another aspect of the present invention provides a storage system in communication with a host computer, the storage system including a first processor, a first memory connected to the first processor, a second processor, a second memory connected to the second processor, and one or more storage drives. A bandwidth between the second processor and the second memory is higher than a bandwidth between the first processor and the first memory. The first memory stores a read command originating from the host computer. The first processor analyzes a content of the read command, reads, from the one or more storage drives, read data corresponding to the read command in accordance with a result of the analysis, stores the read data in the second memory without storing the read data in the first memory, and requests the second processor to execute first processing on the read data stored in the second memory. In response to the request from the first processor, the second processor reads the read data from the second memory, executes the first processing, and stores a result of execution of the first processing in the second memory. The first processor reads the read data or the result of execution of the first processing on the read data stored in the second memory, and transmits the read data or the result to the host computer without storing the read data or the result of execution of the first processing on the read data in the first memory.

According to an aspect of the present invention, a storage system with a configuration more efficient for required performance can be implemented.

DESCRIPTION OF THE PREFERRED EMBODIMENTS

Figure 1:
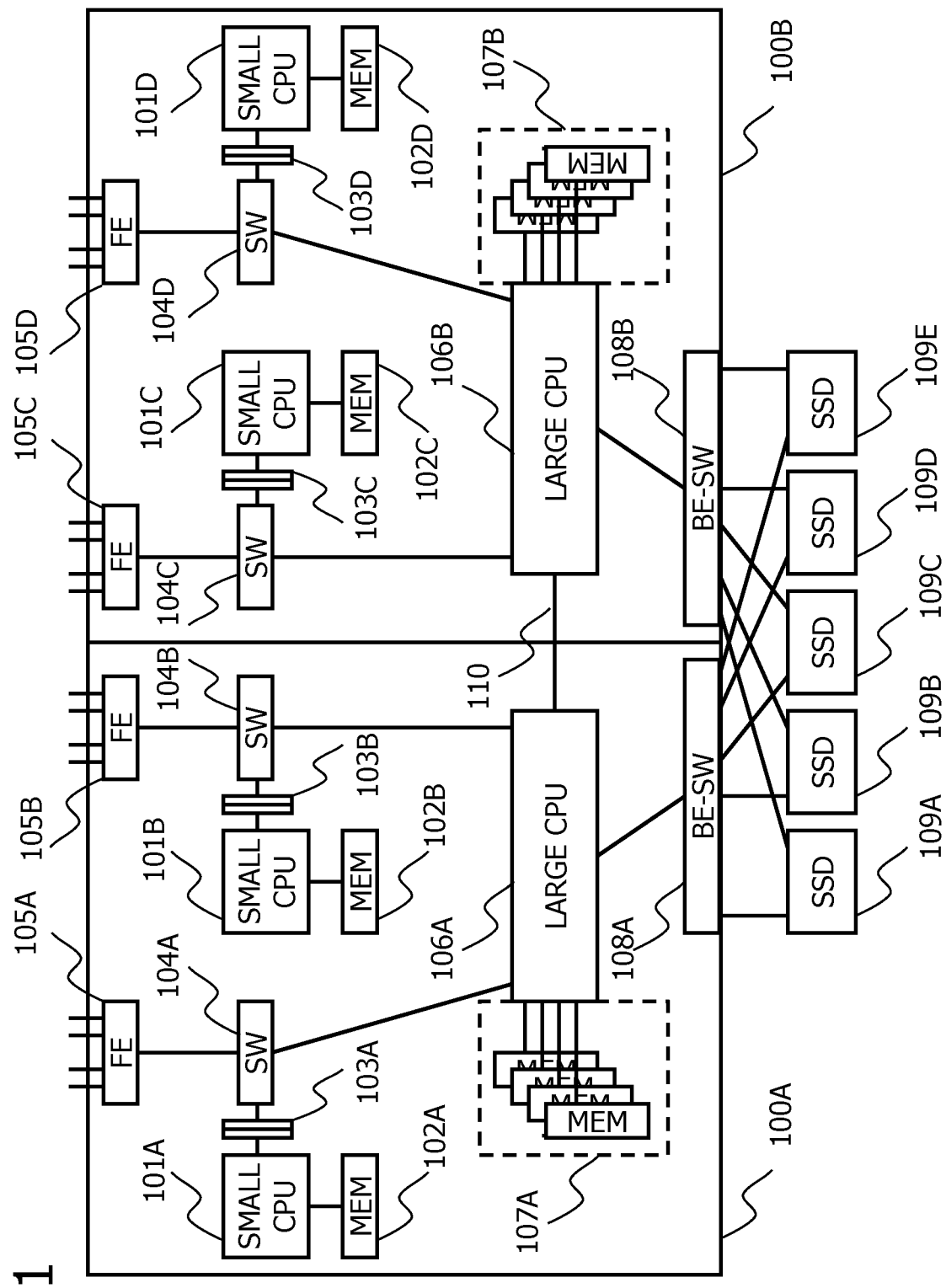
FIG. 1 illustrates a first configuration example of a storage system.

Embodiments of the present invention will be described below on the basis of the drawings. Note that descriptions and drawings below are illustrations for describing the present invention and that, for clarification of description, appropriate omission and simplification are made. The present invention can be implemented in various other forms, and for each component, one or a plurality of the components may be provided unless otherwise noted.

Additionally, embodiments described below are not intended to limit the invention according to claims, and not all combinations of the elements described in the embodiments are essential for solution of the invention.

Various pieces of information may hereinafter be described using expressions such as a "table," a "list," a "queue," and the like but may be expressed using any other data structure. To indicate independence from the data structure, a "table of xxx," a "list of xxx," a "queue of xxx" or the like may be referred to as "xxx information." In the description below, in describing identification information, expressions such as "identification information," an "identifier," a "name," an "ID," a "number," and the like are used but are interchangeable.

In the description below, in a case where a plurality of components including identical or similar functions are provided, the components are basically described with identical reference signs. However, different means may be used to implement the same function. Further, embodiments of the present invention described below may be implemented by software operating on a general-purpose computer, dedicated hardware, or a combination of software and hardware.

Additionally, a "program" may hereinafter be used as a subject in the description of processing. However, the program is executed by a processor (for example, a CPU) and operates for specified processing by appropriately using storage resources (for example, memories), interface devices (communication ports), and/or the like, and thus in the description, the subject of the processing may be the processor.

The processing described using the program as a subject may be processing executed by a computer including the processor (for example, a computing host or a storage apparatus). Additionally, the expression "controller" may refer to a processor or a hardware circuit executing a part or all of the processing performed by the processor.

The program may be installed in each computer from a program source (for example, a program distribution server or a computer readable storage medium). In this case, the program distribution server includes a CPU and a storage resource, and the storage resource further stores a distribution program and a program to be distributed. The distribution program is executed by the CPU. By executing the distribution program, the CPU of the program distribution server may distribute the program to be distributed to other computers.

Additionally, in the description below, two or more programs may be implemented as one program, or one program may be implemented as two or more programs. In addition, a storage drive or simply a drive hereinafter means a physical storage device and is typically a nonvolatile storage device. The drive may be, for example, a hard disk drive (HDD) or a solid state drive (SSD). The storage system may include a mixture of different types of drives.

Embodiment 1

FIG. 1 is a diagram illustrating a configuration example of a storage system according to an embodiment. The storage system receives data generated by a host computer not illustrated, and stores and holds the data. Additionally, the storage system responds to an instruction from a host computer and transmits stored data to the host computer.

The storage system includes a plurality of storage controllers 100A and 100B and one or a plurality of storage drives 100A to 100E. In FIG. 1, the two storage controllers 100A and 100B are illustrated as an example. However, the number of storage controllers is optional and may be only one or three or more. Additionally, in FIG. 1, the five storage drives 109A to 109E are illustrated as an example. However, the number of storage drives is optional.

Each of the storage controllers 100A and 100B communicates with one or a plurality of host computers not illustrated via a frontend network not illustrated. The storage controller 100A uses a backend switch (BE-SW) 108A built in the storage controller 100A to communicate with the storage drives 109A to 109E. The storage controller 100B uses a backend switch 108B built in the storage controller 100B to communicate with the storage drives 109A to 109E.

Additionally, the storage controllers 100A and 100B communicate with each other via a path 110 between the storage controllers. The path 110 is a communication channel utilized between CPUs for redundancy of the storage controllers and includes a wideband interconnect. The communication channel is used for duplication of write data, sharing of metadata, and the like between the storage controllers 100A and 100B. Even in a case where one of the storage controllers is blocked due to maintenance, failure, or the like, the other storage controller can continue the processing of the storage system.

The storage system collectively manages a plurality of storage drives as one memory region, and provides the host computer with a region for storing data. In this case, to prevent some of the storage drives from becoming defective, leading to loss of data, the storage drives may be made redundant using the Redundant Arrays of Inexpensive Disks (RAID) technology for data integrity.

To provide the host computer with the functions of storage, the storage controllers 100A and 100B constitute redundant controllers. Each of the storage controllers 100A and 100B includes one or a plurality of processors and one or a plurality of memories. In the configuration example illustrated in FIG. 1, the storage controller 100A and the storage controller 100B have similar configurations. Note that some components illustrated or not illustrated may be implemented exclusively in one of the storage controllers.

In the configuration example in FIG. 1, the storage controller 100A includes small CPUs 101A and 101B, memories (MEMs) 102A and 102B, buffer management units 103A and 103B, and switches (SW) 104A and 104B. Further, the storage controller 100A includes frontend interfaces 105A and 105B, a large CPU 106A, a memory 107A, and the backend switch 108A. For example, each of the memories 102A and 102B includes one memory device (for example, a dual inline memory module (DIMM)), and the memory 107A includes a plurality of memory devices (for example, DIMMs).

The storage controller 100B includes small CPUs 101C and 101D, a memory 102C, buffer management units 103C and 103D, and switches (SW) 104C and 104D. Further, the storage controller 100B includes frontend interfaces 105C and 105D, a large CPU 106B, a memory 107B, and the backend switch 108B. For example, each of the memories 102C and 102D includes one memory device (for example, a DIMM), and the memory 107B includes a plurality of memory devices (for example, DIMMs).

A configuration of the storage controller 100A will be described below. Similar descriptions are applicable to the storage controller 100B.

The frontend interface 105A, the buffer management unit 103A, and the large CPU 106A are connected to the switch 104A. These components communicate with one another via the switch 104A.

The small CPU 101A is connected to the switch 104A via the buffer management unit 103A. The memory 102A is connected to the small CPU 101A. A memory region in memory 102A is accessed by or via the small CPU 101A.

The frontend interface 105B, the buffer management unit 103B, and the large CPU 106A are connected to the switch 104B. These components communicate with one another via the switch 104B. The small CPU 101B is connected to the switch 104B via the buffer management unit 103B. The memory 102B is connected to the small CPU 101B. A memory region in the memory 102B is accessed by or via the small CPU 101B.

The large CPU 106A is connected to the memory 107A. A memory region in the memory 107A is accessed by or via the large CPU 106A. The large CPU 106A is connected to the backend switch 108A. The large CPU 106A accesses the storage drives 109A to 109E via the backend switch 108A. The large CPU 106A stores data from the host computer in the storage drives 109A to 109E, and reads the data of the host computer from the storage drives 109A to 109E.

The frontend interfaces 105A and 105B are interfaces for connection to a plurality of host computers making various requests to the storage system. The frontend interfaces 105A and 105B perform interconversion of a communication protocol of the host computer and a communication protocol in the storage system.

For communication with the host computer, for example, protocols such as Fiber Channel (FC), Ethernet, Internet Small Computer System Interface (iSCSI), or Non-Volatile Memory express over Fabrics (NVMe-oF) can be utilized. Note that, in the present embodiment, the protocol utilized by the frontend interfaces 105A and 105B is not limited to the examples described above.

For example, Peripheral Component interconnect (PCI)-Express is a standard for an interconnection interface using the switches 104A and 104B. Note that the connection interface in the storage controller 100A is not limited to PCI-Express.

The backend switch 108A is an interface for connection to the plurality of storage drives 109A to 109E mounted in the storage system. The backend switch 108A is an interface for writing and reading data to and from the storage drives 109A to 109E. The backend switch 108A utilizes, for example, the NVMe protocol. The backend protocol is optional and may be, for example, Serial Attached SCSI (SAS) or Serial AT Attachment (SATA).

The memories 102A and 102B and the memory 107A each function as a main storage for the processor, and provides a temporary memory region functioning as a data storage region used by the CPU within the storage system. As described below, the memory 107A provides a buffer region temporarily storing data of the host (host data).

The memory can use, for example, a volatile memory. In addition to or instead of the volatile memory, a nonvolatile memory such as a storage class memory (SCM) may be used. Like a nonvolatile storage medium, a volatile storage medium is a computer-readable, non-transitory storage medium.

An example of the volatile memory is a dynamic random access memory (DRAM). As an example, a DIMM can be utilized that includes a plurality of DRAM chips mounted on a circuit board. A standard with which the connection interface for accessing the DRAM complies is, for example, Double Data Rate 4 (DDR4). Note that the standard for the connection interface for the memory in the storage system is not limited to DDR4.

The small CPUs 101A and 101B are each a semiconductor chip incorporating one or more processor cores and one or more memory control circuits. The small CPUs 101A and 101B respectively store data in the memories 102A and 102B and read data from the memories 102A and 102B. The small CPUs 101A and 101B operate in accordance with command codes in the programs stored in the memories 102A and 102B to implement the desired functions.

The large CPU 106A is a semiconductor chip incorporating one or more processor cores and one or more memory control circuits. The large CPU 106A stores data in the memory 107A and reads data from the memory 107A. The large CPU 106A operates in accordance with command codes in the program stored in the memory 107A to implement the desired functions.

The small CPUs 101A and 101B may have similar configurations having similar computing performance and similar memory bandwidths. The computing performance and the memory bandwidth may vary between the small CPUs 101A and 101B. The large CPU 106A includes a higher memory bandwidth than the small CPUs 101A and 101B. A higher memory bandwidth means that a larger amount of data can be transmitted to and received from the one or more memories connected to the CPU in a specific period. Note that the computing performance of the large CPU 106A may be identical to or different from the computing performance of the small CPUs 101A and 101B.

Figure 2A:
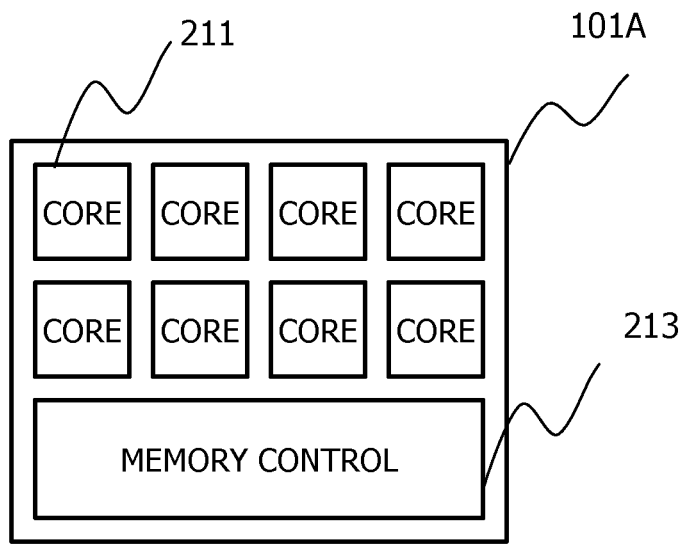
FIGS. 2A and 2B illustrate an example for describing the effect of a reduced CPU area.

FIG. 2A schematically illustrates a configuration example of the semiconductor chip of the small CPU 101A. The other small CPU 101B can include a similar configuration. The small CPU 101A includes eight processor cores 211 and one low-speed memory control circuit 213. In FIG. 2A, one processor core is denoted by reference sign 211 as an example. The memory control circuit 213 is a circuit in communication with one memory 102A (for example, a DIMM).

Figure 2B:
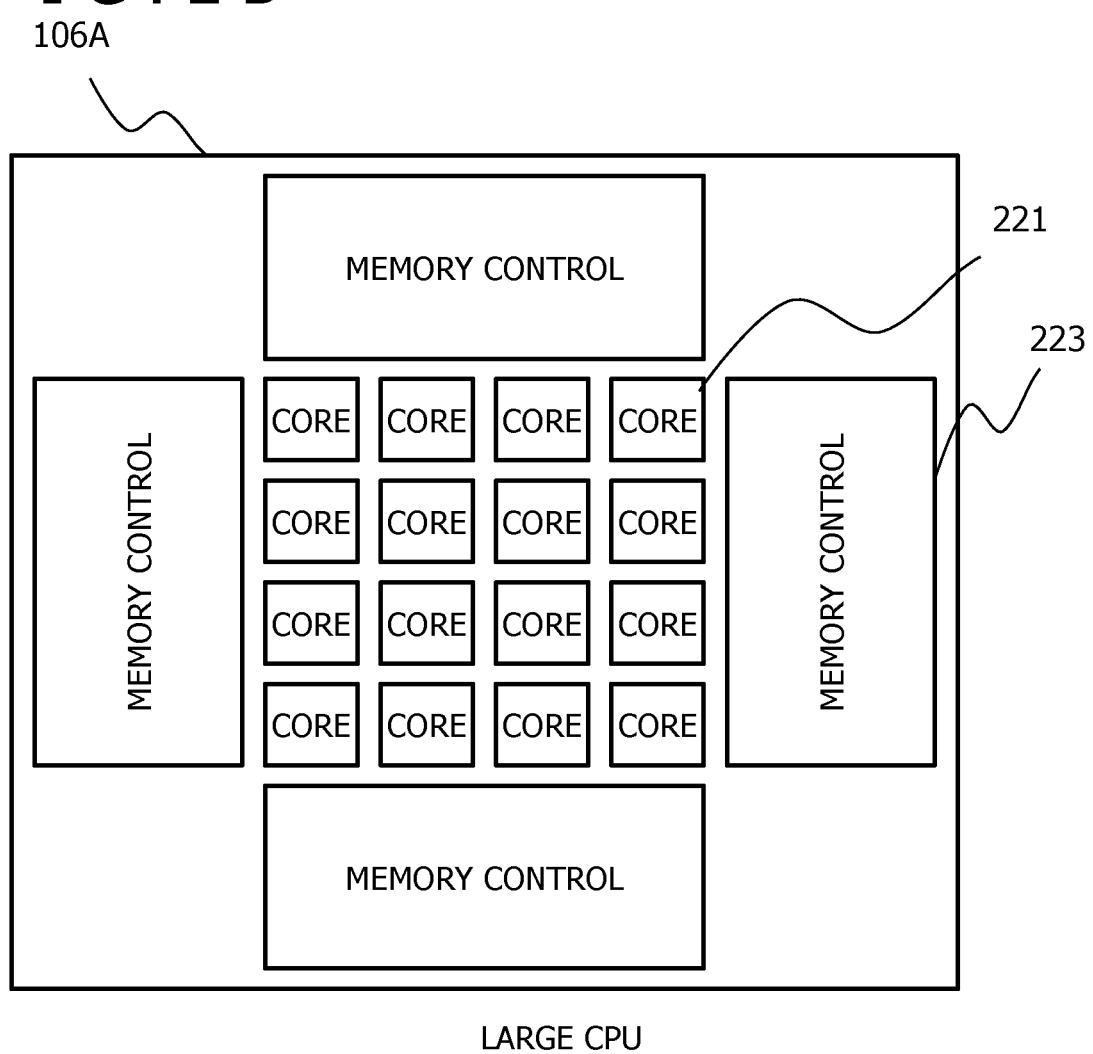

FIG. 2B schematically illustrates a configuration example of the semiconductor chip of the large CPU 106A. The large CPU 106A includes 16 processor cores 221 and four memory control circuits 223. In FIG. 2B, one processor core is denoted by reference sign 221 as an example, and one memory control circuit is denoted by reference sign 223 as an example. The number of the memory control circuits 223 is the same as the number of memory devices in the memory 107A, and each of the memory control circuits 223 communicates with each of the memory devices in the memory 107A. The configuration example in FIG. 2B includes four memory control circuits 223, and the large CPU 106A can simultaneously access four memory devices.

In the configuration examples illustrated in FIGS. 2A and 2B, the computing performance of the CPU typically depends on the computing performance of one processor core and the number of processor cores, and the memory bandwidth of the CPU depends on the number of memory devices that can be simultaneously accessed, in other words, the number of memory control circuits. In the configuration examples illustrated in FIGS. 2A and 2B, the large CPU 106A includes more memory control circuits than the small CPU 101A. Thus, the large CPU 106A has a larger memory bandwidth than the small CPU 101A. On the other hand, the large CPU 106A includes a larger-scale and more complicated circuit configuration than the small CPU 101A and also has a larger area of the semiconductor chip than the small CPU 101A.

Note that, in these configuration examples, the configuration of one memory control circuit may be common or may vary, and a core circuit configuration may be common or may vary. Higher computing performance or a larger memory bandwidth of the CPU requires a more complicated, larger-area circuit as a semiconductor chip. Additionally, a larger area of the CPU results from lower manufacturing efficiency and higher costs of the CPU.

Figure 3A:
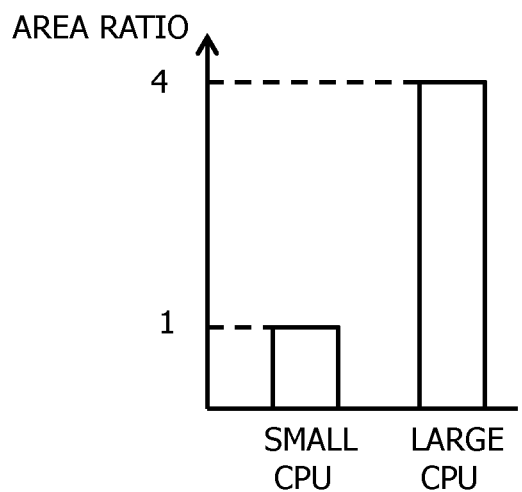
FIGS. 3A and 3B illustrate an example for describing the effect of a reduced CPU area.

FIG. 3A schematically illustrates an example of the area ratio between the large CPU 106A and the small CPU 101A. In the configuration examples illustrated in FIGS. 2A and 2B, for example, the area ratio between one small CPU 101A and one large CPU 106A is 1:4.

Figure 3B:
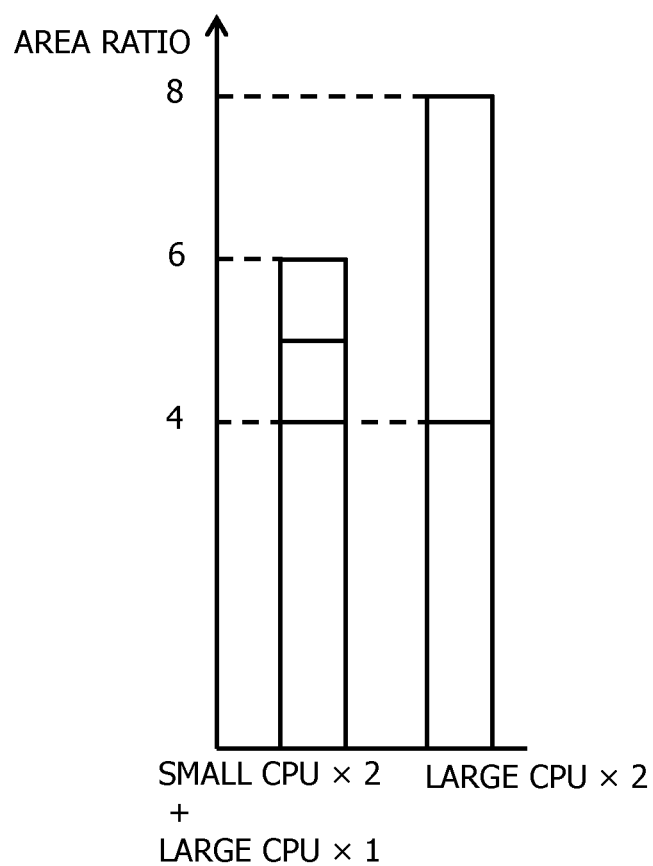

FIG. 3B illustrates the area ratio between a combination of two small CPUs 101A and one large CPU 106A and a combination of two large CPUs 106A. The area ratio is 6:8. Between the combinations, the ratio of the number of cores is 32:32, and the ratio of the number of memory control circuits is 6:8.

The storage system includes processing involving access to a large amount of data such as data input to and output from the host computer (also referred to as host data or user data) and processing involving no access to a large amount of data. Executing the processing involving access to a large amount of data at high speed requires a higher memory bandwidth. The speed of the processing involving no access to a large amount of data has only insignificant dependence on the memory bandwidth.

When the large CPU is mainly responsible for the processing involving access to a large amount of data whereas the small CPU is mainly responsible for the processing involving no access to a large amount of data, processing time comparable to one achieved by a plurality of CPUs can be achieved by a combination of a smaller number of large CPUs and one or more small CPUs.

For example, in the example described above, processing time comparable to one achieved by two large CPUs can be achieved by a combination of two small CPUs and one large CPU. As described above, the total area of the combination of two small CPUs and one large CPU is smaller than the total area of two large CPUs. In other words, a CPU circuit configuration that can be more efficiently manufactured enables performance required for the storage system to be achieved.

Furthermore, in the configuration example illustrated in FIG. 1, one large CPU 106A executes processing of host data corresponding to commands from the host computers having been processed by two small CPUs 101A and 101B. As described above, the large CPU 106A has a higher memory bandwidth than the small CPUs 101A and 101B. Thus, the large CPU 106A can process the host data in a shorter processing time than the small CPUs 101A and 101B. Note that the number of small CPUs mounted in one storage controller may be equal to or less or more than the number of large CPUs, and the computing performance of the small CPU may be similar to the computing performance of the large CPU.

Figure 4:
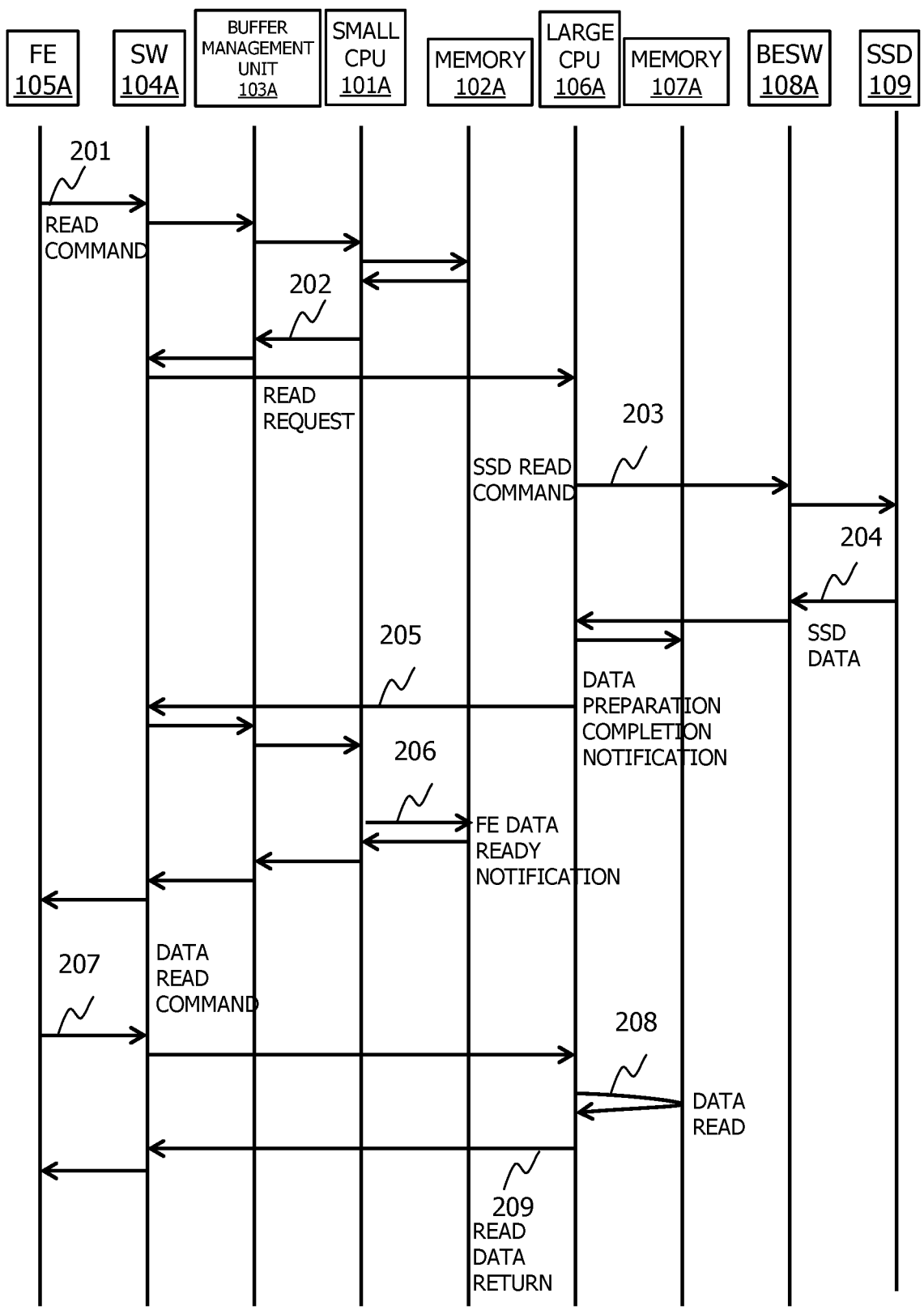
FIG. 4 illustrates an example of a processing sequence of read commands in the first configuration example.

A processing example of the storage controller will be described below. FIG. 4 is a sequence diagram illustrating an example of read processing by the storage controller 100A. The read processing involves reading specified host data (read data) from the storage drive in response to a read command from the host computer, and transferring the data to the host computer.

An example will be described below in which read data is read from the storage drive and transferred to the host computer. Similar description is applicable to the storage controller 100B. In FIG. 4, time elapses downward. This also applies to other sequence diagrams. Additionally, an optional SSD is denoted by reference sign 109.

The frontend interface 105A receives a read command from the host computer not illustrated and stores the read command in the memory 102A via the switch 104A, the buffer management unit 103A, and the memory control circuit of the small CPU 101A. For example, a queue region is set on the memory 102A in advance, and the read command received from the host computer is stored in the queue region. Further, the small CPU 101A acquires the read command from the queue region on the memory 102A and analyzes the read command (201).

In accordance with the result of analysis of the read command, the small CPU 101A transmits a read request to the large CPU 106A via the buffer management unit 103A and the switch 104 along with a logical volume number specified by the read command and a block address in the logical volume (202). Note that the small CPU 101A may specify one of the SSDs 109A to 109E corresponding to the logical volume number and the block address specified by the read command, and a block address in the SSD 109.

In response to the read request from the small CPU 101A, the large CPU 106A reads, from the SSD 109, the read data specified by the host computer. The large CPU 106A converts the logical volume number and the block address in the logical volume specified by the read command from the host computer into a specified one of the SSDs 109A to 109E and a block address in the SSD 109, and transmits an SSD read command specifying the block address to the SSD 109 via the backend switch 108A (203). In a case where the small CPU 101A specifies one of the SSDs 109A to 109E and the block address in the SSD 109, the conversion by the large CPU 106A is omitted. Note that the SSD read command may be transmitted directly from the large CPU 106A to the SSD 109 as illustrated in FIG. 4, or that the SSD read command may be temporarily stored in the queue region set on the memory 107A and then the SSD 109 may retrieve the SSD read command from the queue region on the memory 107A.

The large CPU 106A stores, in the memory 107A, SSD data (read data) received from the SSD 109 (204). The large CPU 106A transmits a data preparation completion notification to the small CPU 101A via the switch 104A (205). In response to the data preparation completion notification, the small CPU 101A stores, in the memory 102A, an FE data ready notification notifying the frontend interface 105A that read data has been prepared. For such a notification to the frontend interface 105A, a queue region may be set on the memory 102A in advance and the notification may be stored in the queue region as is the case with the read command received from the host computer. The frontend interface 105A acquires the FE data ready notification from the queue region on the memory 102A via the switch 104A and the buffer management unit 103A (206).

In response to the FE data ready notification, the frontend interface 105A transmits a data read command to the large CPU 106A via the switch 104A (207). In response to the data read command, the large CPU 106A reads the data specified by the memory 107A (108), and returns the read data read out to the frontend interface 105A via the switch 104A (209). The processing of the data read command may be executed by one of the processor cores of the large CPU 106A by controlling the memory control circuit or may be directly executed by the memory control circuit on the large CPU 106A without the intervention of the processor cores. The frontend interface 105A returns the read data received to the host computer.

Figure 5:
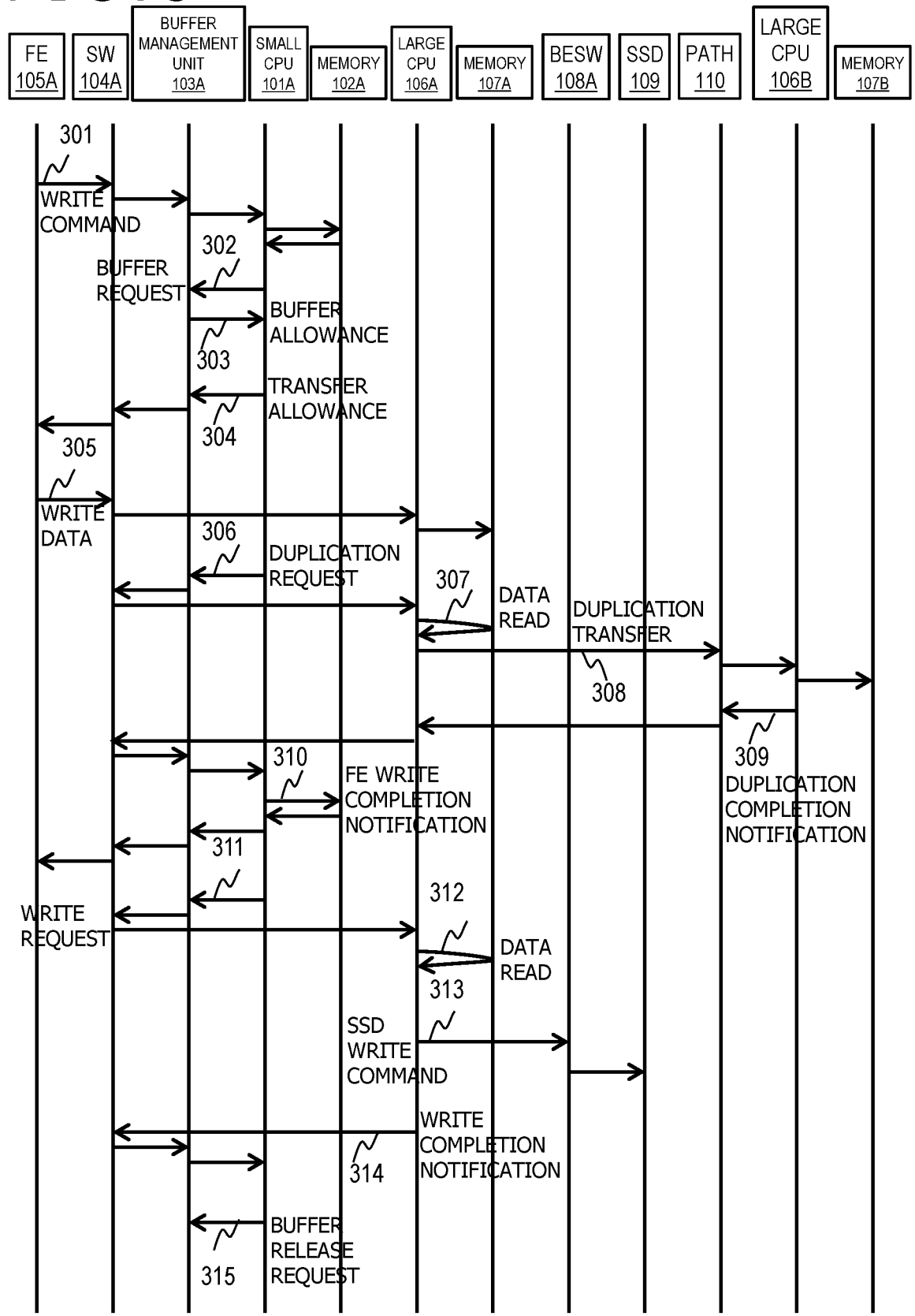
FIG. 5 illustrates an example of a processing sequence of write commands in the first configuration example.

Now, an example of write processing for a write command from the host computer will be described. FIG. 5 is a sequence diagram illustrating an example of write processing by the storage controller 100A. The write processing includes receiving a write command and host data (write data) from the host computer, and storing the write data at a block address in the storage drive corresponding to the logical volume number specified by the write command and the block address in the logical volume.

The frontend interface 105A receives the write command from the host computer. The frontend interface 105A stores the write command in the memory 102A via the switch 104A, the buffer management unit 103A, and the memory control circuit of the small CPU 101A. For example, as is the case with the read command transmitted from the host computer, a queue region is set on the memory 102A in advance, and the write command received from the host computer is stored in the queue region. Further, the small CPU 101A acquires the write command from the queue region on the memory 102A and analyzes the write command (301).

In accordance with the result of analysis of the write command, the small CPU 101A determines a buffer size required to receive write data from the host computer, and transmits, to the buffer management unit 103A, a buffer request specifying the buffer size (302).

The buffer management unit 103A is assigned by the large CPU 106A a buffer region in the memory 107A that can be used as a buffer, and manages the buffer region. The buffer management unit 103A assigns an empty region in the buffer region as a memory region for a buffer request, and returns, to the small CPU 101A, a buffer allowance specifying the address of the memory region (303). Note that different buffer regions may be assigned to the buffer management units 103A and 103B or that a common buffer region may be jointly managed by the buffer management units 103A and 103b.

Figure 6:
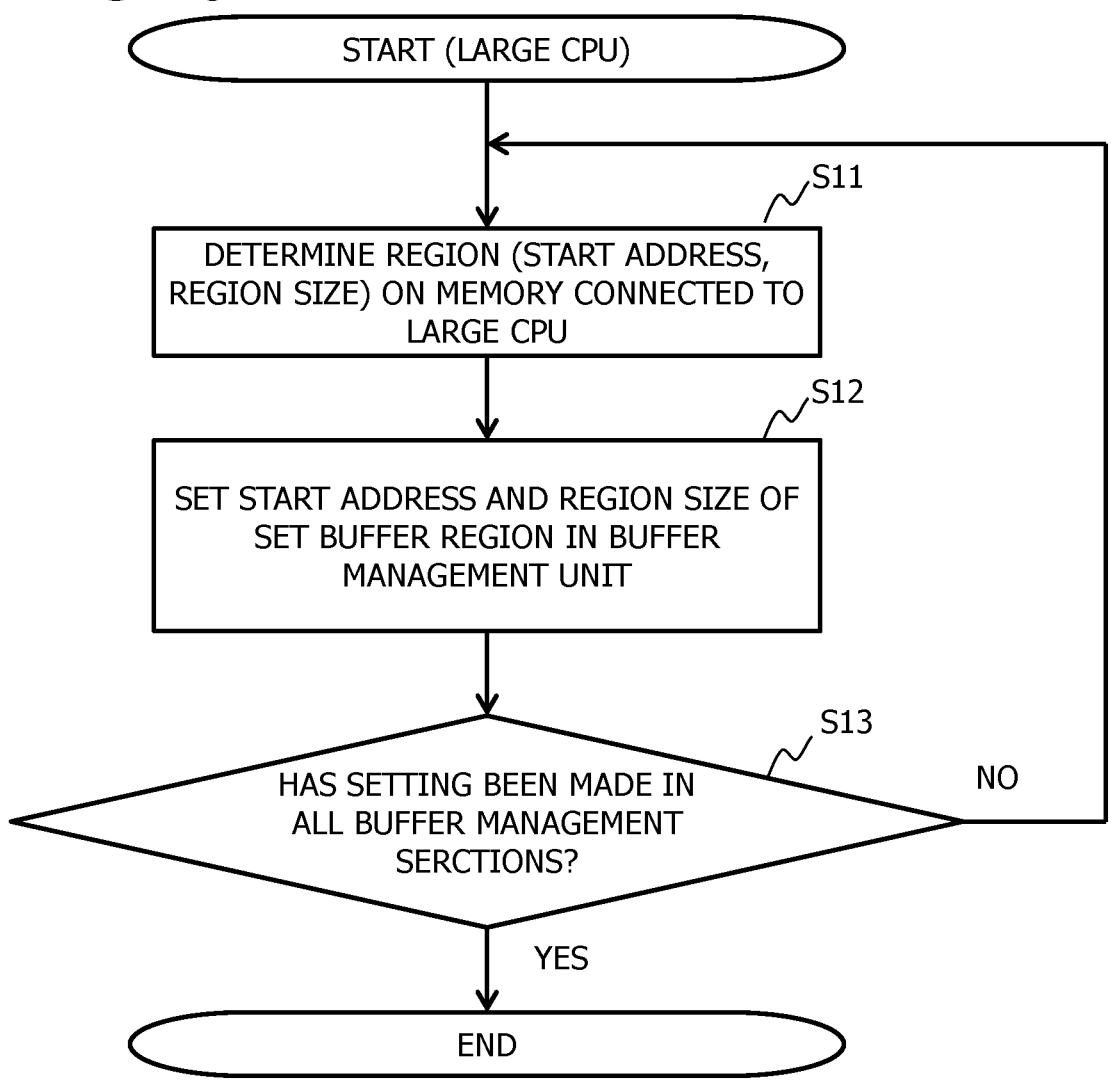
FIG. 6 illustrates an example of a flowchart of processing for setting a buffer region in a buffer management unit.

FIG. 6 is a flowchart illustrating a processing example in which the large CPU 106A assigns a buffer region from the memory 107A to the buffer management units 103A and 103B. The large CPU 106A selects one of the buffer management units, determines a region on the memory 107A (start address and region size) (S11), and sets the start address and the region size of the buffer region in the selected buffer management unit (S12).

Then, the large CPU 106A determines whether a buffer region has been set for all of the buffer management units in the storage controller 100A (S13). In a case where a buffer region has been set for all of the buffer management units (S13: YES), the present flow ends. In a case where any buffer management unit remains unset (S13: NO), the flow returns to step S11.

As described above, the buffer management units 103A and 103B are provided by the large CPU 106A with setting of a buffer region on the memory 107A, thus allowing the small CPU 101A to be assigned the buffer region on the memory 107A not directly connected to the small CPU 101A.

Referring back to FIG. 5, in response to the buffer allowance, the small CPU 101A transmits, to the frontend interface 105A, a transfer allowance specifying the address of the memory region acquired (304). The frontend interface 105A notifies the host computer that the frontend interface 105A is ready to receive data, and receives write data from the host computer. The frontend interface 105A transmits the write data received to the large CPU 106A along with the address of the memory region specified by the transfer allowance (304). The large CPU 106A stores the write data at the specified address in the memory 107A (305). This storing the write data in the memory 107A may be executed by one of the processor cores on the large CPU 106A by controlling the memory control circuit, or may be directly executed by the memory control circuit on the large CPU 106A without the intervention of the processor cores.

Then, the small CPU 101A transmits a duplication request for the write data to the large CPU 106A via the buffer management unit 103A and the switch 104A (306). The large CPU 106A reads, from the buffer region on the memory 107A, write data to be duplicated (307), and transfers the write data to the large CPU 106B of the other storage controller 100B via the path 110 as duplication transfer. The reading the write data from the memory 107A may also be executed by one of the processor cores on the large CPU 106A by controlling the memory control circuit, or may be directly executed by the memory control circuit on the large CPU 106A without the intervention of the processor cores. The large CPU 106B stores the data received in the memory 107B (308). The storing the write data in the memory 107B may also be executed by one of the processor cores on the large CPU 106B by controlling the memory control circuit, or may be directly executed by the memory control circuit on the large CPU 106B without the intervention of the processor cores. Thus, even in a case where the memory 107A or 107B is inaccessible due to any defect, the write data can be retrieved from the other memory, thus enabling a reduction in the possibility of loss of the write data.

The large CPU 106B returns a duplication completion notification to the large CPU 106A via the path 110. In response to the duplication completion notification from the large CPU 106B, the large CPU 106A returns the duplication completion notification to the small CPU 101A via the switch 104A and the buffer management unit 103A (309).

In response to the duplication completion notification from the large CPU 106A, the small CPU 101A stores, in the memory 102A, an FE write completion notification notifying the frontend interface 105A that processing for storing the write data is complete. For such a notification to the frontend interface 105A as well, a queue region may be set in the memory 102A in advance and the notification may be stored in the queue region, as is the case with the write command received from the host computer. The frontend interface 105A acquires the FE write completion notification from the queue region on the memory 102A via the switch 104A and the buffer management unit 103A (310). In response to the acquisition of the FE write completion notification, the frontend interface 105A returns a write completion notification to the host computer.

Then, the small CPU 101A transmits a write request to the SSD 109, to the large CPU 106A via the buffer management unit 103A and the switch 104A (311). In response to the write request, the large CPU 106A reads specified data from the buffer region in the memory 107A (312), and transmits the data to the SSD 109 via the backend switch 108A along with an SSD write command (313). The SSD write command may be transmitted directly from the large CPU 106A to the SSD 109 as illustrated in FIG. 5, or the SSD write command may be temporarily stored in a queue region set on the memory 107A, and the SSD 109 may retrieve the SSD write command from the queue region on the memory 107A. Additionally, the large CPU 106A determines one of the plurality of SSDs 109A to 109E to which the write data is to be written, and the block address in the SSD 109 to which the write data is to be written.

Then, the large CPU 106A transmits an SSD 109 write completion notification to the small CPU 101A via the switch 104A and the buffer management unit 103A (314). In response to the write completion notification, the small CPU 101A transmits, to the buffer management unit 103A, a request to release the memory region used for the current write command (315). In response to the request, the buffer management unit 103A releases the specified memory region such that the memory region can be used for new write processing again.

The processing described with reference to FIGS. 4 and 5 is also executed in the frontend interface 105B, the small CPU 101B, the memory 102B, the buffer management unit 103B, the switch 104B, the large CPU 106B, the backend switch 108A, and the SSD 109. This also applies to the storage controller 100B.

Embodiment 2

A storage system according to another embodiment of the present specification will be described below. In an embodiment described below, write data is converted, for example, compressed, deduplicated, or ciphered, and converted data is stored in the storage drive. This allows for an increased amount of data stored or improved security.

Figure 7:
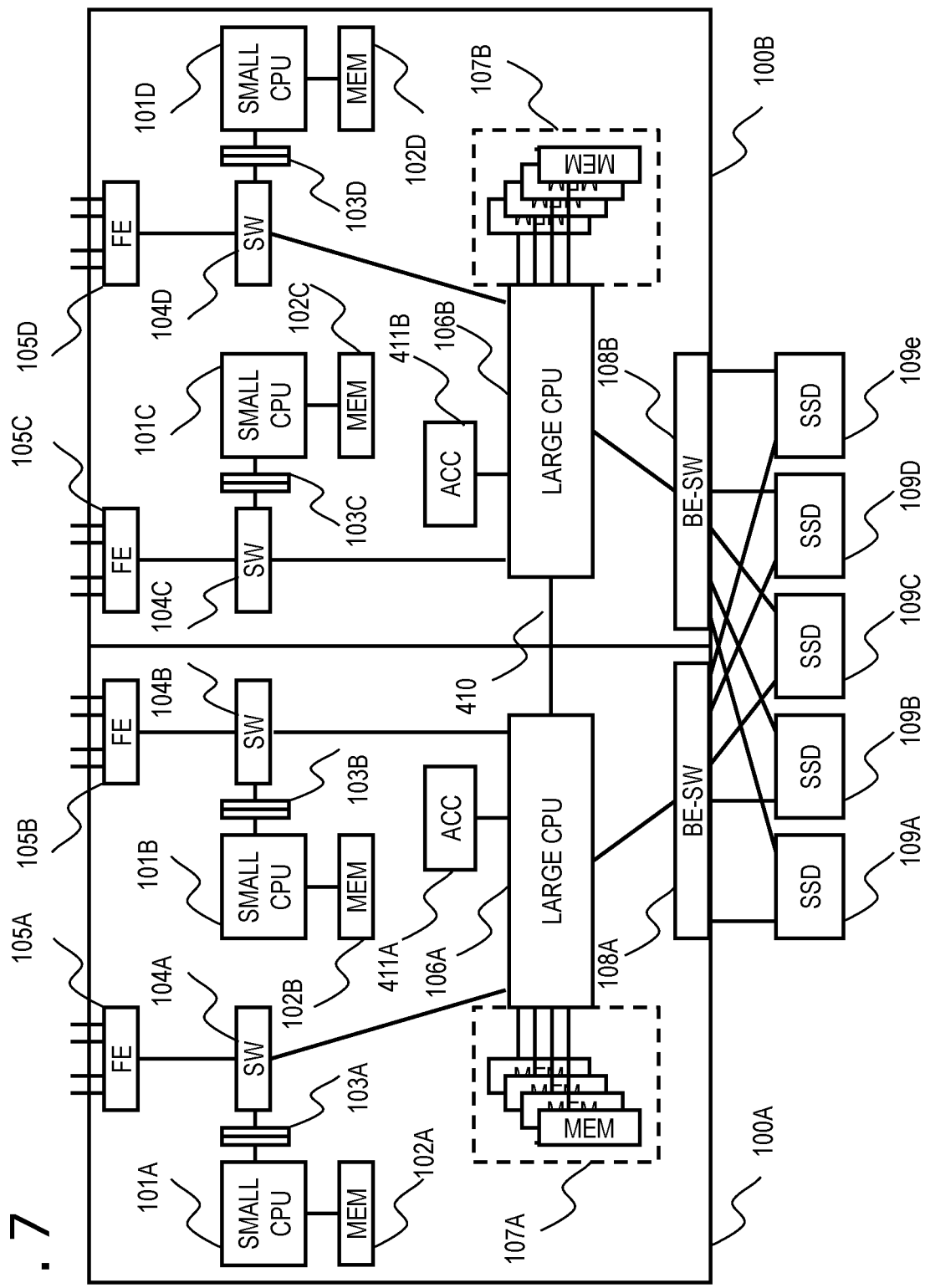
FIG. 7 illustrates a second configuration example of the storage system.

FIG. 7 is a diagram illustrating a configuration example of the storage system according to the embodiment. Differences of the configuration example in FIG. 7 from the configuration example in FIG. 1 will be mainly described. Note that components with reference signs identical to those in FIG. 1 are of identical types but may execute different types of processing. The storage system includes accelerators (ACCs) 411A and 411B. Each of the accelerators 411A and 411B is a data conversion unit. The accelerator 411A is connected to the large CPU 106A, and the accelerator 411B is connected to the large CPU 106B.

The accelerators 411A and 411B are hardware respectively performing, for example, compression and decompression of data at high speed in the storage controllers 100A and 100B. The accelerators 411A and 411B compress write data and store compressed data in the SSD 109. Additionally, compressed data read from the SSD 109 is decompressed by the accelerators 411A and 411B, in which the data is restored to the original form. In addition to or instead of the processing described above, the accelerators 411A and 411B may execute ciphering and deduplicating processing.

The accelerators 411A and 411B can execute data conversion processing such as compression and decompression processing at high speed instead of the CPUs of the storage controllers 100A and 100B. In the present embodiment, an example will be described in which one accelerator is installed in one storage controller. However, the present embodiment is not limited to this number. For example, two accelerators may be installed in one storage controller.

Figure 8:
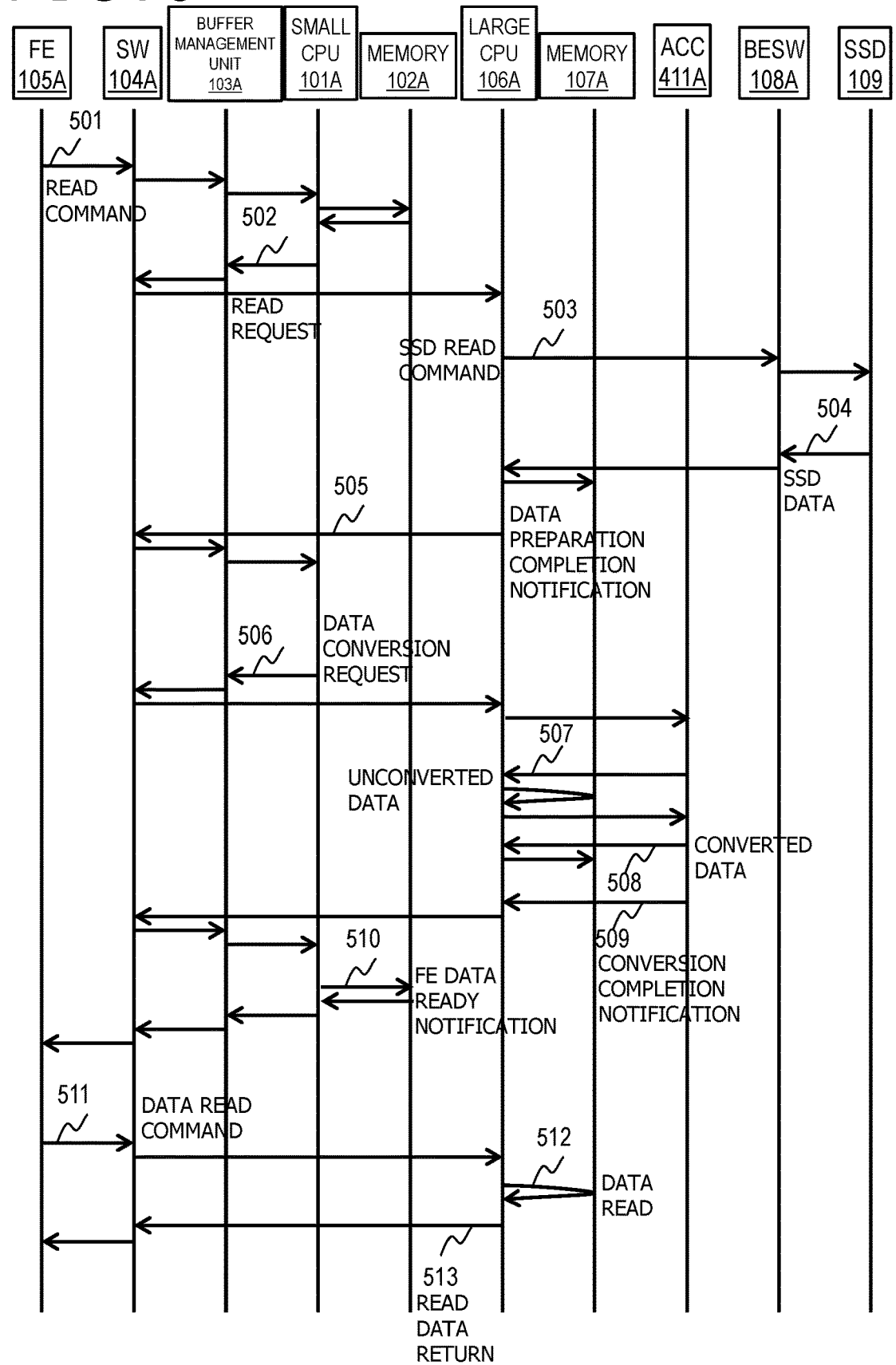
FIG. 8 illustrates an example of a processing sequence of read commands in the second configuration example.

With reference to FIG. 8, processing will be described that is executed for the read command from the host computer. An example will be described in which read data is read from the storage device and transferred to the host computer. The frontend interface 105A receives the read command from the host computer, and stores the read command in the memory 102A via the switch 104A, the buffer management unit 103A, and the memory control circuit of the small CPU 101A. As in the case of FIG. 4, for example, a queue region is set on the memory 102A in advance, and the read command received from the host computer is stored in the queue region. Further, the small CPU 101A acquires the read command from the queue region on the memory 102A and analyzes the read command (501).

In accordance with the result of analysis of the read command, the small CPU 101A transmits a read request to the large CPU 106A via the buffer management unit 103A and the switch 104A along with a logical volume number specified by the read command and a block address in the logical volume (502). Note that the small CPU 101A may specify one of the SSDs 109A to 109E corresponding to the logical volume number and the block address specified by the read command, and a block address in the SSD 109.

In accordance with the read request from the small CPU 101A, the large CPU 106A reads, from the SSD 109, read data specified by the host computer. The read data in this case corresponds to data into which the host data has been converted. The large CPU 106A converts the logical volume number specified by the read command from the host computer and the block address in the logical volume into a specified one of the SSDs 109A to 109E and a block address in the SSD 109, and transmits an SSD read command specifying the block address to the SSD 109 via the backend switch 108A (503). In a case where the small CPU 101A converts into a specified one of the SSDs 109A to 109E and a block address in the SSD 109, the conversion by the large CPU 106A is omitted. Note that, as is the case with FIG. 4, the SSD read command may be transmitted directly from the large CPU 106A to the SSD 109 as illustrated in FIG. 8 or that the SSD read command may be temporarily stored in the queue region set on the memory 107A and then the SSD 109 may retrieve the SSD read command from the queue region on the memory 107A.

The large CPU 106A stores, in the memory 107A, the SSD data received from the SSD 109 (504). The storing the SSD data in the memory 107A may be executed by one of the processor cores on the large CPU 106A by controlling the memory control circuit, or may be directly executed by the memory control circuit on the large CPU 106A without the intervention of the processor cores. The large CPU 106A transmits a data preparation completion notification to the small CPU 101A via the switch 104A and the buffer management unit 103A (505). In response to the data preparation completion notification, the small CPU 101A transmits a data conversion request for the read data to the large CPU 106A via the buffer management unit 103A and the switch 104A. The large CPU 106A transfers the data transfer request to the accelerator 411A (506).

In response to the data transfer request, the accelerator 411A reads target data from the memory 107A via the large CPU 106A (507) and performs predetermined data conversion. Then, the accelerator 411A stores converted data in the memory 107A via the large CPU 106A (508). The reading the data from the memory 107A and the storing the converted data may also be executed by one of the processor cores on the large CPU 106A by controlling the memory control circuit, or may be directly executed by the memory control circuit on the large CPU 106A without the intervention of the processor cores. The accelerator 411A returns a conversion completion notification to the large CPU 106A. The large CPU 106A transmits the conversion completion notification to the small CPU 101A via the switch 104A and the buffer management unit 103A (509).

In response to the conversion completion notification, the small CPU 101A stores, in the memory 102A, an FE data ready notification notifying the frontend interface 105A that the read data (converted data) has been prepared. For such notification to the frontend interface 105A as well, as is the case with the read command received from the host computer as illustrated in FIG. 4, a queue region may be set on the memory 102A in advance and the notification may be stored in the queue region. The frontend interface 105A acquires the FE data ready notification from the queue region on the memory 102A via the switch 104A and the buffer management unit 103A (510).

In response to the FE data ready notification, the frontend interface 105A transmits a data read command to the large CPU 106A via the switch 104A (511). In response to the data read command, the large CPU 106A reads data specified by the memory 107A (512) and returns the data read out to the frontend interface 105A via the switch 104A (513). The processing for the data read command may also be executed by one of the processor cores on the large CPU 106A by controlling the memory control circuit, or may be directly executed by the memory control circuit on the large CPU 106A without the intervention of the processor cores. The frontend interface 105A returns the read data received to the host computer.

Figure 9:
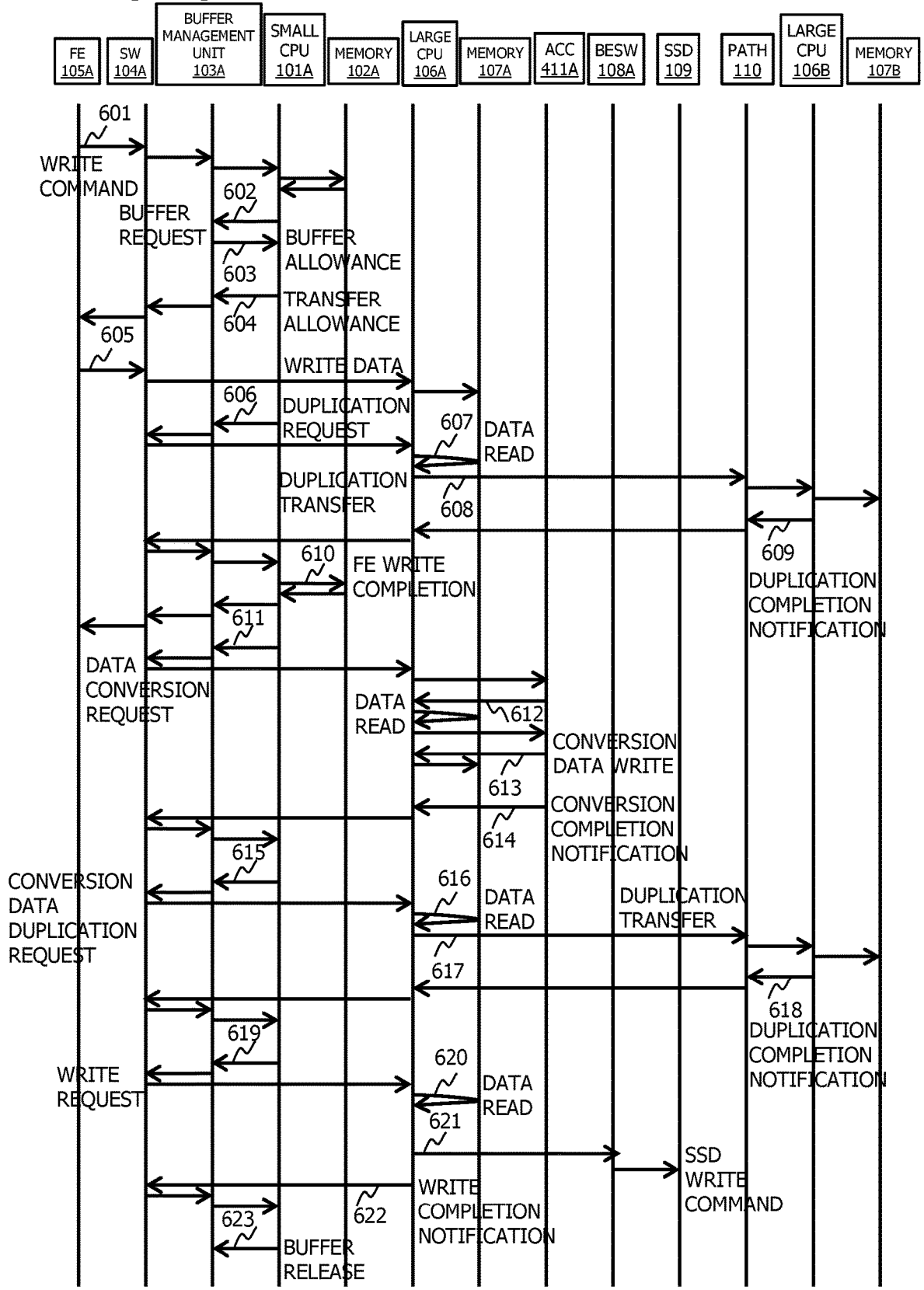
FIG. 9 illustrates an example of a processing sequence of write commands in the second configuration example.

Now, an example of the write processing for the write command from the host computer will be described. FIG. 9 is a sequence diagram illustrating an example of the write processing by the storage controller 100A. The write processing includes receiving the write command and host data (write data) from the host computer and storing the write data at a block address in the storage drive corresponding to the logical volume number specified by the write command and the block address in the logical volume.

The frontend interface 105A receives the write command from the host computer. The frontend interface 105A stores the write command in the memory 102A via the switch 104A, the buffer management unit 103A, and the memory control circuit of the small CPU 101A. For example, as is the case with read command transmitted from the host computer, a queue region is set on the memory 102A in advance, and the write command received from the host computer is stored in the queue region. Further, the small CPU 101A acquires the write command from the queue region on the memory 102A and analyzes the write command (601).

In accordance with the result of analysis of the write command, the small CPU 101A determines a buffer size required to receive write data from the host computer, and transmits, to the buffer management unit 103A, a buffer request specifying the buffer size (602). The buffer management unit 103A is assigned by the large CPU 106A a buffer region in the memory 107A that can be used as a buffer, and manages the buffer region. The buffer management unit 103A assigns an empty region in the buffer region as a memory region for the buffer request, and returns, to the small CPU 101A, a buffer allowance specifying the address of the memory region (603).

In response to the buffer allowance, the small CPU 101A transmits, to the frontend interface 105A, a transfer allowance specifying the address of the memory region acquired (604). The frontend interface 105A notifies the host computer that the frontend interface 105A is ready to receive data, and receives the write data from the host computer. The frontend interface 105A transmits the write data received to the large CPU 106A along with the address of the memory region specified by the transfer allowance (604). The large CPU 106A stores the write data at the specified address in the memory 107A (605). The storing the write data in the memory 107A may also be executed by one of the processor cores on the large CPU 106A by controlling the memory control circuit as in the case of FIG. 5, or may be directly executed by the memory control circuit on the large CPU 106A without the intervention of the processor cores.

Then, the small CPU 101A transmits a duplication request for the write data to the large CPU 106A via the buffer management unit 103A and the switch 104A (606). In response to the duplication request, the large CPU 106A reads, from the buffer region on the memory 107A, write data to be duplicated (607), and transfers the write data to the large CPU 106B of the other storage controller 100B via the path 110. The reading the write data from the memory 107A may also be executed by one of the processor cores on the large CPU 106A by controlling the memory control circuit as in the case of FIG. 5, or may be directly executed by the memory control circuit on the large CPU 106A without the intervention of the processor cores.

The large CPU 106B stores the data received in the memory 107B (608). The storing the write data in the memory 107B may also be executed by one of the processor cores on the large CPU 106B by controlling the memory control circuit, or may be directly executed by the memory control circuit on the large CPU 106B without the intervention of the processor cores. Accordingly, even in a case where the memory 107A or 107B is inaccessible, the write data can be retrieved from the other memory, thus enabling a reduction in the possibility of loss of the write data due to any defect.

The large CPU 106B returns a duplication completion notification to the large CPU 106A via the path 110. In response to the duplication completion notification from the large CPU 106B, the large CPU 106A returns the duplication completion notification to the small CPU 101A via the switch 104A and the buffer management unit 103A (609).

In response to the duplication completion notification from the large CPU 106A, the small CPU 101A stores, in the memory 102A, an FE write completion notification notifying the frontend interface 105A that the processing for storing the write data is complete. For such notification to the frontend interface 105A as well, a queue region may be set on the memory 102A in advance, and the notification may be stored in the queue region, as is the case with the write command received from the host computer. The frontend interface 105A acquires the FE write completion notification from the queue region on the memory 102A via the switch 104A and the buffer management unit 103A (610). In response to the acquisition of the FE write completion notification, the frontend interface 105A returns a write completion notification to the host computer.

Then, the small CPU 101A transmits a data conversion request to the large CPU 106A via the buffer management unit 103A and the switch 104A. The large CPU 106A transmits the data conversion request to the accelerator 411A (611).

In response to the data conversion request, the accelerator 411A reads unconverted data from the memory 107A via the large CPU 106A (612), and performs predetermined data conversion. Then, the accelerator 411A writes converted data to the memory 107A via the large CPU 106A (613). The reading the unconverted data from the memory 107A and the storing the converted data may be executed by one of the processor cores on the large CPU 106A by controlling the memory control circuit, or may be directly executed by the memory control circuit on the large CPU 106A. The converted data may be stored in a region different from the memory region of the unconverted write data or may be stored in the same region as the memory region for the unconverted write data.

The accelerator 411A returns a conversion completion notification to the large CPU 106A. The large CPU 106A returns the conversion completion notification to the small CPU 101A via the switch 104A and the buffer management unit 103A (614). The conversion completion notification may indicate a data size after conversion.

In response to the conversion completion notification, the small CPU 101A transmits a duplication request for converted data to the large CPU 106A via the buffer management unit 103A and the switch 104A (615). In response to the duplication request, the large CPU 106A reads, from the memory 107A, converted data of the target to be duplicated (616), and transfers the converted data to the large CPU 106B of the other storage controller 100B via the path 110 as duplicate transfer. The reading the converted data from the memory 107A may also be executed by one of the processor cores on the large CPU 106A by controlling the memory control circuit, or may be directly executed by the memory control circuit on the large CPU 106A without the intervention of the processor cores.

The large CPU 106B stores the data received in the memory 107B (617). The storing the converted data in the memory 107B may also be executed by one of the processor cores on the large CPU 106B by controlling the memory control circuit, or may be directly executed by the memory control circuit on the large CPU 106B without the intervention of the processor cores. Accordingly, even in a case where the memory 107A or 107B is inaccessible due to any defect, the converted data can be retrieved from the other memory, thus enabling a reduction in the possibility of loss of the converted data.

The large CPU 106B returns a duplication completion notification to the large CPU 106A via the path 110. In response to the duplication completion notification from the large CPU 106B, the large CPU 106A returns the duplication completion notification to the small CPU 101A via the switch 104A and the buffer management unit 103A (618).

In response to the duplication completion notification from the large CPU 106A, the small CPU 101A transmits a write request to the SSD 109, to the large CPU 106A via the buffer management unit 103A and the switch 104A (619). In response to the write request, the large CPU 106A reads specified data from the memory 107A (620), and transmits the specified data to the SSD 109 via the backend switch 108A along with the SSD write command (621).

The SSD write command may be transmitted directly from the large CPU 106A to the SSD 109 as illustrated in FIG. 9, or the SSD write command may be temporarily stored in a queue region set on the memory 107A, and the SSD 109 may retrieve the SSD write command from the queue region on the memory 107A. Additionally, the large CPU 106A determines one of the plurality of SSDs 109A to 109E to which the write data is to be written, and the block address in the SSD 109 to which the write data is to be written.

Then, the large CPU 106A transmits an SSD 109 write completion notification to the small CPU 101A via the switch 104A and the buffer management unit 103A (622). In response to the write completion notification, the small CPU 101A transmits, to the buffer management unit 103A, a request to release the memory region used for the write command (623). In response to the request to release the memory region, the buffer management unit 103A releases the specified memory region such that the memory region can be used for new write processing again.

The processing described with reference to FIGS. 8 and 9 is also executed in the frontend interface 105B, the small CPU 101B, the memory 102B, the buffer management unit 103B, the switch 104B, the large CPU 106A, the accelerator 411A, the backend switch 108A, and the SSD 109. This also applies to the storage controller 100B.

Embodiment 3

A storage system according to another embodiment of the present specification will be described below. The embodiment described below includes a router on the storage controller instead of the switch. The router includes a datagram routing function. This allows enhancement of durability against failures in the CPU.

Figure 10:
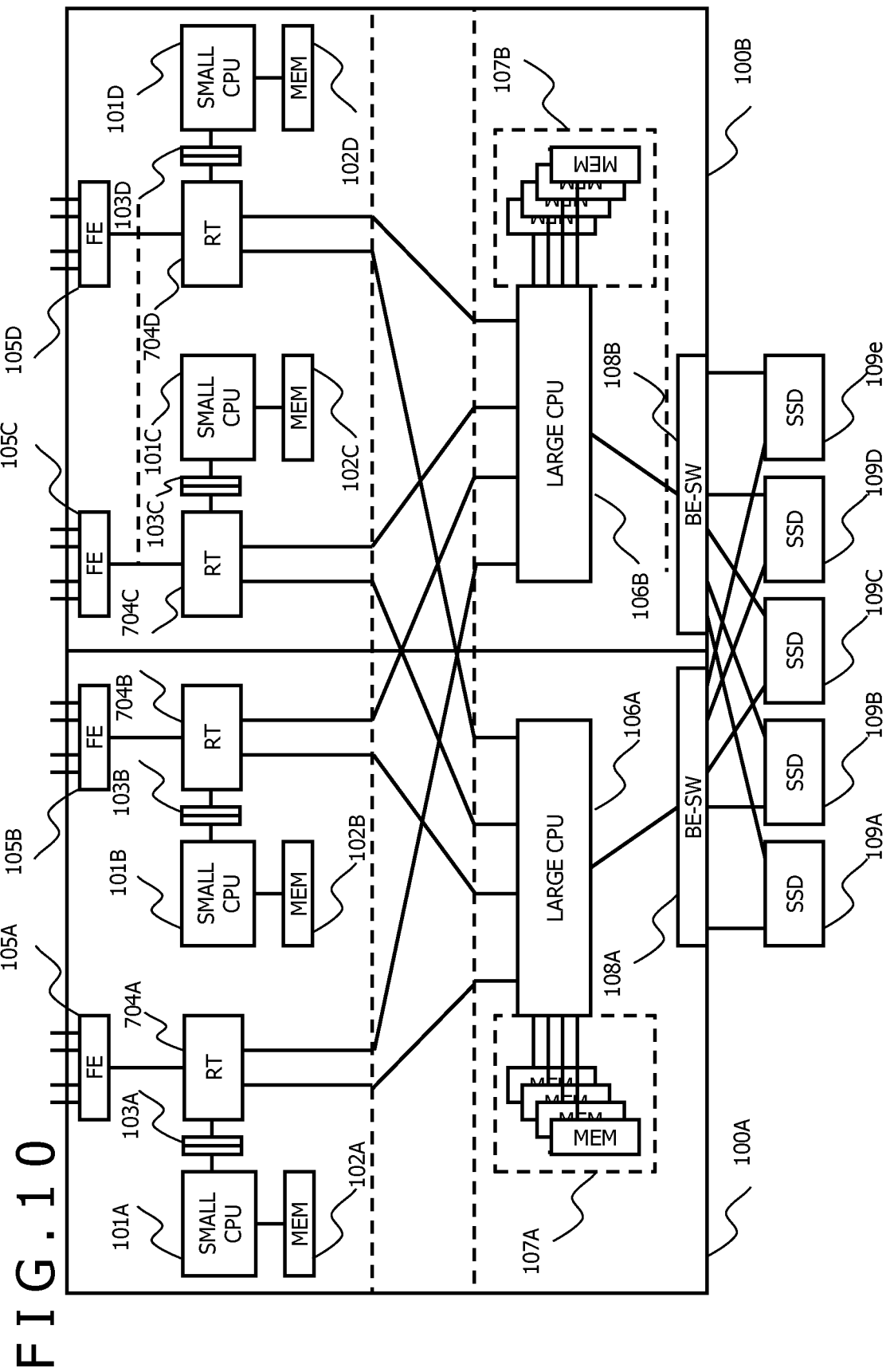
FIG. 10 illustrates a third configuration example of the storage system.

FIG. 10 is a diagram illustrating a configuration example of the storage system according to the embodiment. Differences from the configuration example in FIG. 1 will mainly be described below. Note that components with reference signs identical to those in FIG. 1 are of identical types but may execute different types of processing. The storage system includes routers 704A to 704D instead of the switches 104A to 104D.

The router 704A performs routing between the small CPU 101A, the buffer management unit 103A, and the frontend interface 105A and the large CPUs 106A and 106B. The router 704B performs routing between the small CPU 101B, the buffer management unit 103B, and the frontend interface 105B and the large CPUs 106A and 106B.

The router 704C performs routing between the small CPU 101C, the buffer management unit 103C, and the frontend interface 105C and the large CPUs 106A and 106B. The router 704D performs routing between the small CPU 101D, the buffer management unit 103D, and the frontend interface 105D and the large CPUs 106A and 106B. Additionally, the routers 704A to 704D relay communication between the large CPU 106A and the large CPU 106B.

In an example, a dashed section may be mounted on a different circuit board. Specifically, the small CPU 101A, the memory 102A, the buffer management unit 103A, the frontend interface 105A, and the router 704A may be mounted on one circuit board. The small CPU 101B, the memory 102B, the buffer management unit 103B, the frontend interface 105B, and the router 704B may be mounted on another circuit board.

The small CPU 101C, the memory 102C, the buffer management unit 103C, the frontend interface 105C, and the router 704C may be mounted on another circuit board. The small CPU 101D, the memory 102D, the buffer management unit 103D, the frontend interface 105D, and the router 704D may be mounted on another circuit board.

The large CPU 106A, the memory 107A, and the backend switch 108A are mounted on another circuit board. The large CPU 106B, the memory 107B, and the backend switch 108B may be mounted on another circuit board. The configuration with the components mounted on different circuit board enables easy troubleshooting to be achieved by replacing the circuit board.

Figure 11:
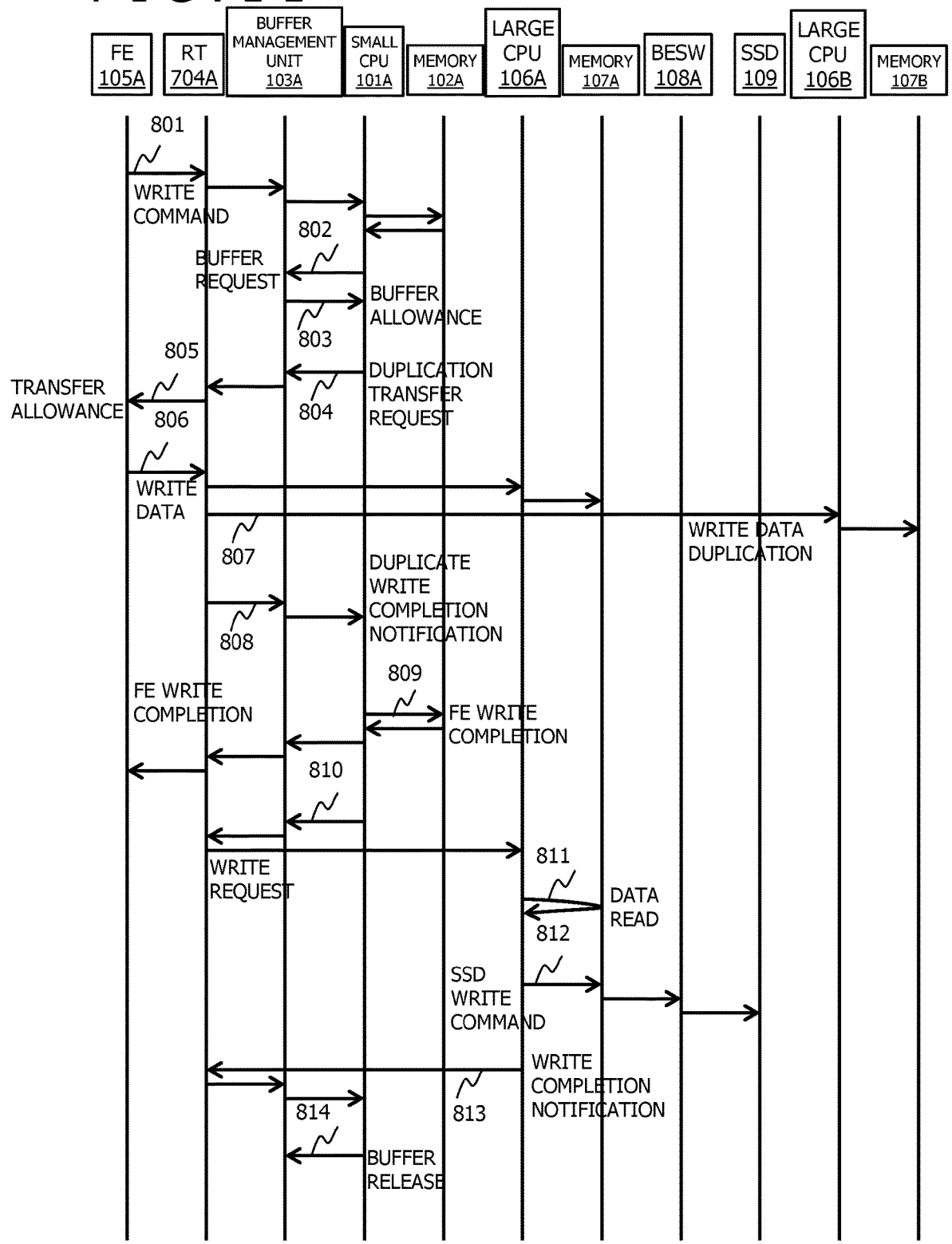
FIG. 11 illustrates an example of a processing sequence of write commands in the third configuration example.

An example of write processing for the write command from the host computer will be described. Read processing is similar to the read processing in Embodiment 1. FIG. 11 is a sequence diagram illustrating an example of write processing by the storage controller 100A. The write processing includes receiving the write command and host data (write data) from the host computer and storing the write data at a block address in the storage drive corresponding to the logical volume number specified by the write command and the block address in the logical volume.

The frontend interface 105A receives the write command from the host computer. The frontend interface 105A stores the write command in the memory 102A via the router (RT) 704A, the buffer management unit 103A, and the memory control circuit of the small CPU 101A. For example, as is the case with the read command transmitted from the host computer, a queue region is set on the memory 102A in advance, and the write command received from the host computer is stored in the queue region. Further, the small CPU 101A acquires the write command from the queue region on the memory 102A and analyzes the write command (801).

In accordance with the result of analysis of the write command, the small CPU 101A determines a buffer size required to receive write data from the host computer, and transmits, to the buffer management unit 103A, a buffer request specifying the buffer size (802).

The buffer management unit 103A is assigned a buffer region from the memory 107B directly accessed by the large CPU 106B using the memory control circuit, in addition to the memory 107A directly accessed by the large CPU 106A using the memory control circuit. The buffer management unit 103A assigns empty regions in the buffer regions in the respective memories 107A and 107B as memory regions for the buffer request, and returns, to the small CPU 101A, a buffer allowance specifying the addresses of the two memory regions (803).

In response to the buffer allowance, the small CPU 101A transmits, to the router 704A via the buffer management unit 103A, a duplicate transfer request for the write data which request specifies the addresses of the two memory regions on the memories 107A and 107B which regions have been acquired (804). The router 704A transfers a transfer allowance for the write data to the frontend interface 105A (805).

The frontend interface 105A notifies the host computer that the frontend interface 105A is ready to receive data, and receives the write data from the host computer. The router 704A receives the write data from the frontend interface 105A, and transmits the write data received to the large CPU 106A along with the address of the memory region on the memory 107A. At the same time, the router 704A duplicates the write data received, and transmits the write data to the large CPU 106B along with the address of the memory region on the memory 107B. The large CPU 106A receives and stores the write data at the specified address of the memory region on the memory 107A (806).

The large CPU 106B receives and stores the write data at the specified address of the memory region on the memory 107B (807). The storing the write data in the memories 107A and 107B may be executed by one of the processor cores on the large CPUs 106A and 106B by controlling the memory control circuit, or may be directly executed by the memory control circuits on the large CPUs 106A and 106B without the intervention of the processor cores. Accordingly, even in a case where the memory 107A or 107B is inaccessible due to any defect, the write data can be retrieved from the other memory, thus enabling a reduction in the possibility of loss of the write data.

The router 704A returns a duplicate write completion notification to the small CPU 101A via the buffer management unit 103A (808). In response to the duplicate write completion notification, the small CPU 101A stores, in the memory 102A, an FE write completion notification notifying the frontend interface 105A that the processing for storing the write data is complete. For such notification to the frontend interface 105A as well, a queue region may be set on the memory 102A in advance, and the notification may be stored in the queue region, as is the case with the write command received from the host computer.

The frontend interface 105A acquires the FE write completion notification from the queue region on the memory 102A via the router 704A and the buffer management unit 103A (809). In response to the acquisition of the FE write completion notification, the frontend interface 105A returns a write completion notification to the host computer.

Then, the small CPU 101A transmits a write request to the SSD 109, to the large CPU 106A via the buffer management unit 103A and the router 704A (810). In response to the write request, the large CPU 106A reads specified data from the buffer region in the memory 107A (811), and transmits the data to the SSD 109 via the backend switch 108A along with the SSD write command (812).

The SSD write command may be transmitted directly from the large CPU 106A to the SSD 109 as illustrated in FIG. 11, or the SSD write command may be temporarily stored in a queue region set on the memory 107A, and the SSD 109 may retrieve the SSD write command from the queue region on the memory 107A. Additionally, the large CPU 106A determines one of the plurality of SSDs 109A to 109E to which the write data is to be written, and the block address in the SSD 109 to which the write data is to be written.

Then, the large CPU 106A transmits a write completion notification to the SSD 109, to the small CPU 101A via the router 704A and the buffer management unit 103A (813). In response to the write completion notification, the small CPU 101A transmits, to the buffer management unit 103A, a request to release the memory region used for the current write command (814). In response to the request, the buffer management unit 103A releases the specified memory regions such that the memory regions can be used for new write processing again.

Note that the small CPU 101A may request the large CPU 106B instead of the large CPU 106A to write, to the SSD 109, data stored in the memory 107B. The large CPU 106B performs the operation described above of the large CPU 106A.

The processing described with reference to FIG. 11 is also executed in the frontend interface 105B, the small CPU 101B, the memory 102B, the buffer management unit 103B, the router 704B, the large CPU 106B, the backend switch 108A, and the SSD 109. This also applies to the storage controller 100B.

Embodiment 4

A storage system according to another embodiment of the present specification will be described below. The embodiment described below includes a router on the storage controller instead of the switch and further includes an accelerator that converts write data. This configuration can produce effects similar to those of the accelerator and the router in Embodiments 2 and 3.

Figure 12:
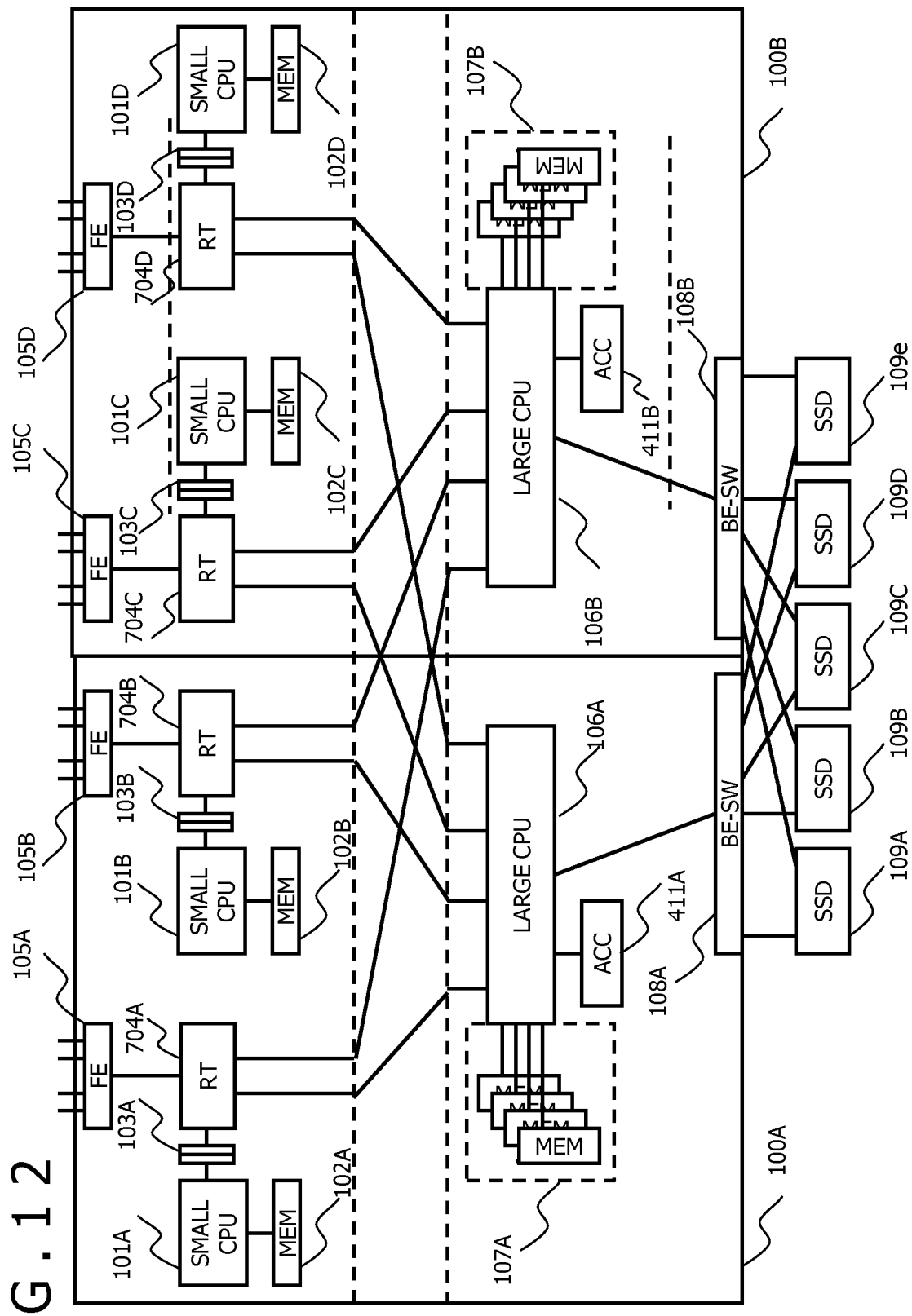
FIG. 12 illustrates a fourth configuration example of the storage system.

FIG. 12 is a diagram illustrating a configuration example of the storage system according to the embodiment. Differences from the configuration example in FIG. 10 will mainly be described below. Note that components with reference signs identical to those in FIG. 10 are of identical types but may execute different types of processing. The storage system includes accelerators (ACCs) 411A and 411B. Each of the accelerators 411A and 411B is used as a data conversion unit. The accelerator 411A is connected to the large CPU 106A, and the accelerator 411B is connected to the large CPU 106B. The functions of the accelerators 411A and 411B are similar to the functions of the accelerators 411A and 411B in Embodiment 2.

Figure 13:
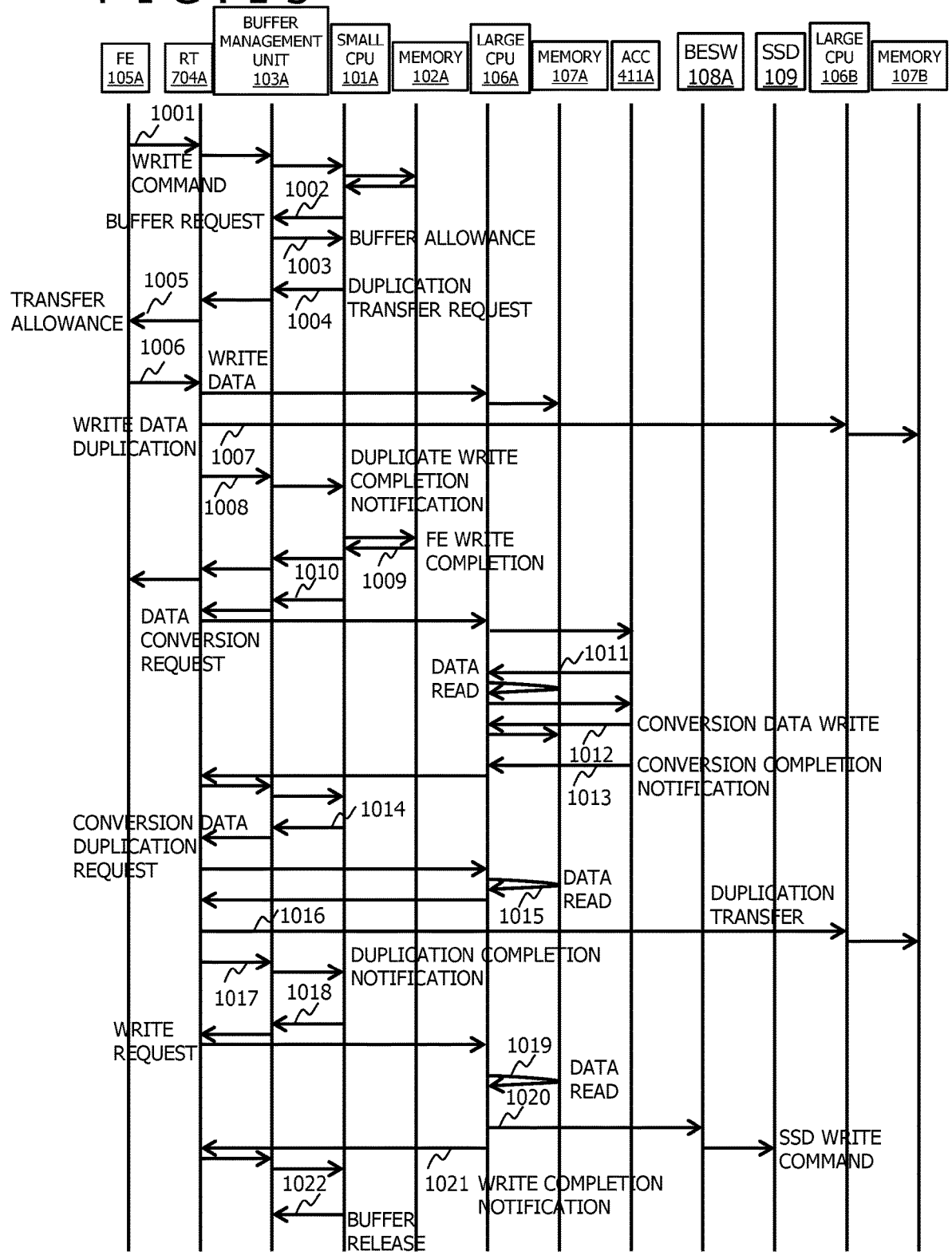
FIG. 13 illustrates an example of a processing sequence of write commands in the fourth configuration example.

An example of write processing for the write command from the host computer will be described. Read processing is similar to the read processing in Embodiment 2. FIG. 13 is a sequence diagram illustrating an example of write processing by the storage controller 100A. The write processing includes receiving the write command and host data (write data) from the host computer and storing the write data at a block address in the storage drive corresponding to the logical volume number specified by the write command and the block address in the logical volume.

The frontend interface 105A receives the write command from the host computer. The frontend interface 105A stores the write command in the memory 102A via the router 704A, the buffer management unit 103A, and the memory control circuit of the small CPU 101A. For example, as is the case with the read command transmitted from the host computer, a queue region is set on the memory 102A in advance, and the write command received from the host computer is stored in the queue region.

Further, the small CPU 101A acquires the write command from the queue region on the memory 102A and analyzes the write command. In accordance with the result of analysis of the write command, the small CPU 101A determines a buffer size required to receive write data from the host computer (1001).

The small CPU 101A transmits, to the buffer management unit 103A, a buffer request specifying the buffer size determined (1002). The buffer management unit 103A assigns empty regions in the buffer regions in the respective memories 107A and 107B as memory regions for the buffer request, and returns, to the small CPU 101A, a buffer allowance specifying the addresses of the two memory regions (1003).

In response to the buffer allowance, the small CPU 101A transmits, to the router 704A via the buffer management unit 103A, a duplicate transfer request for the write data which request specifies the addresses of the two memory regions on the memories 107A and 107B which regions have been acquired (1004). The router 704A transfers a transfer allowance for the write data to the frontend interface 105A (1005).

The frontend interface 105A notifies the host computer that the frontend interface 105A is ready to receive data, and receives the write data from the host computer. The router 704A receives the write data from the frontend interface 105A, and transmits the write data received to the large CPU 106A along with the address of the memory region on the memory 107A. At the same time, the router 704A duplicates the write data received, and transmits the write data to the large CPU 106B along with the address of the memory region on the memory 107B. The large CPU 106A receives and stores the write data at the address of the memory region on the memory 107A (1006).

The large CPU 106B receives and stores the write data at the address of the memory region on the memory 107B (1007). The storing the write data in the memories 107A and 107B may be executed by one of the processor cores on the large CPUs 106A and 106B by controlling the memory control circuit, or may be directly executed by the memory control circuits on the large CPUs 106A and 106B without the intervention of the processor cores. Accordingly, even in a case where the memory 107A or 107B is inaccessible due to any defect, the write data can be retrieved from the other memory, thus enabling a reduction in the possibility of loss of the write data.

The router 704A returns a duplicate write completion notification to the small CPU 101A via the buffer management unit 103A (1008). In response to the duplicate write completion notification, the small CPU 101A stores, in the memory 102A, an FE write completion notification notifying the frontend interface 105A that the processing for storing the write data is complete. For such notification to the frontend interface 105A as well, a queue region may be set on the memory 102A in advance, and the notification may be stored in the queue region, as is the case with the write command received from the host computer.

The frontend interface 105A acquires the FE write completion notification from the queue region on the memory 102A via the router 704A and the buffer management unit 103A (1009). In response to the acquisition of the FE write completion notification, the frontend interface 105A returns a write completion notification to the host computer.

Then, the small CPU 101A transmits a data conversion request to the large CPU 106A via the buffer management unit 103A and the router 704A. The large CPU 106A transmits the data conversion request to the accelerator 411A (1010).

In response to the data conversion request, the accelerator 411A reads unconverted data from the memory 107A via the large CPU 106A (1011), and performs predetermined data conversion. Then, the accelerator 411A writes converted data to the memory 107A via the large CPU 106A (1012). The reading the unconverted data from the memory 107A and the storing the converted data may be executed by one of the processor cores on the large CPU 106A by controlling the memory control circuit, or may be directly executed by the memory control circuit on the large CPU 106A. The converted data may be stored in a region different from the memory region for the unconverted write data or may be stored in the same region as the memory region for the unconverted write data.

The accelerator 411A returns a conversion completion notification to the large CPU 106A. The large CPU 106A returns the conversion completion notification to the small CPU 101A via the router 704A and the buffer management unit 103A (1013). The conversion completion notification may indicate a data size after conversion.

In response to the conversion completion notification, the small CPU 101A transmits a duplication request for converted data to the router 704A via the buffer management unit 103A (1014). In response to the duplication request, the router 704A cause the large CPU 106A to read, from the memory 107A, converted data of the target to be duplicated (1015), and to transfer the converted data to the large CPU 106B of the other storage controller 100B as duplicate transfer. The reading the converted data from the memory 107A may also be executed by one of the processor cores on the large CPU 106A by controlling the memory control circuit, or may be directly executed by the memory control circuit on the large CPU 106A without the intervention of the processor cores.

The large CPU 106B stores the data received in the memory 107B (1016). The storing the converted data in the memory 107B may also be executed by one of the processor cores on the large CPU 106B by controlling the memory control circuit, or may be directly executed by the memory control circuit on the large CPU 106B without the intervention of the processor cores. Accordingly, even in a case where the memory 107A or 107B is inaccessible due to any defect, the converted data can be retrieved from the other memory, thus enabling a reduction in the possibility of loss of the converted data.

The router 704A returns a duplication completion notification to the small CPU 101A via the buffer management unit 103A (1017). In response to the duplication completion notification, the small CPU 101A transmits a write request to the SSD 109, to the large CPU 106A via the buffer management unit 103A and the router 704A (1018).

In response to the write request, the large CPU 106A reads specified data from the memory 107A (1019), and transmits the data to the SSD 109 via the backend switch 108A along with the SSD write command (1020). The SSD write command may be transmitted directly from the large CPU 106A to the SSD 109 as illustrated in FIG. 13, or the SSD write command may be temporarily stored in a queue region set on the memory 107A, and the SSD 109 may retrieve the SSD write command from the queue region on the memory 107A. Additionally, the large CPU 106A determines one of the plurality of SSDs 109A to 109E to which the write data is to be written, and the block address in the SSD 109 to which the write data is to be written.

Then, the large CPU 106A transmits a write completion notification to the SSD 109, to the small CPU 101A via the router 704A and the buffer management unit 103A (1021). In response to the write completion notification, the small CPU 101A transmits, to the buffer management unit 103A, a request to release the memory regions used for the current write command (1022). In response to the request to release the memory regions, the buffer management unit 103A releases the specified memory regions such that the memory regions can be used for new write processing again.

Note that the small CPU 101A may request the large CPU 106B instead of the large CPU 106A to write, to the SSD 109, data stored in the memory 107B. The large CPU 106B performs the operation described above of the large CPU 106A.

The processing described with reference to FIG. 13 is also executed in the frontend interface 105B, the small CPU 101B, the memory 102B, the buffer management unit 103B, the router 704B, the large CPU 106A, the accelerator 411A, the backend switch 108A, and the SSD 109. This also applies to the storage controller 100B.

Embodiment 5

A storage system according to another embodiment of the present specification will be described below. In the embodiment described below, the small CPU outputs the read or write command to the SSD, and the large CPU performs data conversion. Thus, the small CPU executes all processing other than the data conversion, allowing processing efficiency to be improved. Additionally, the large CPU can concentrate on the data conversion. Note that the data conversion can be made more efficient by providing the large CPU with an accelerator that performs the data conversion.

Figure 14:
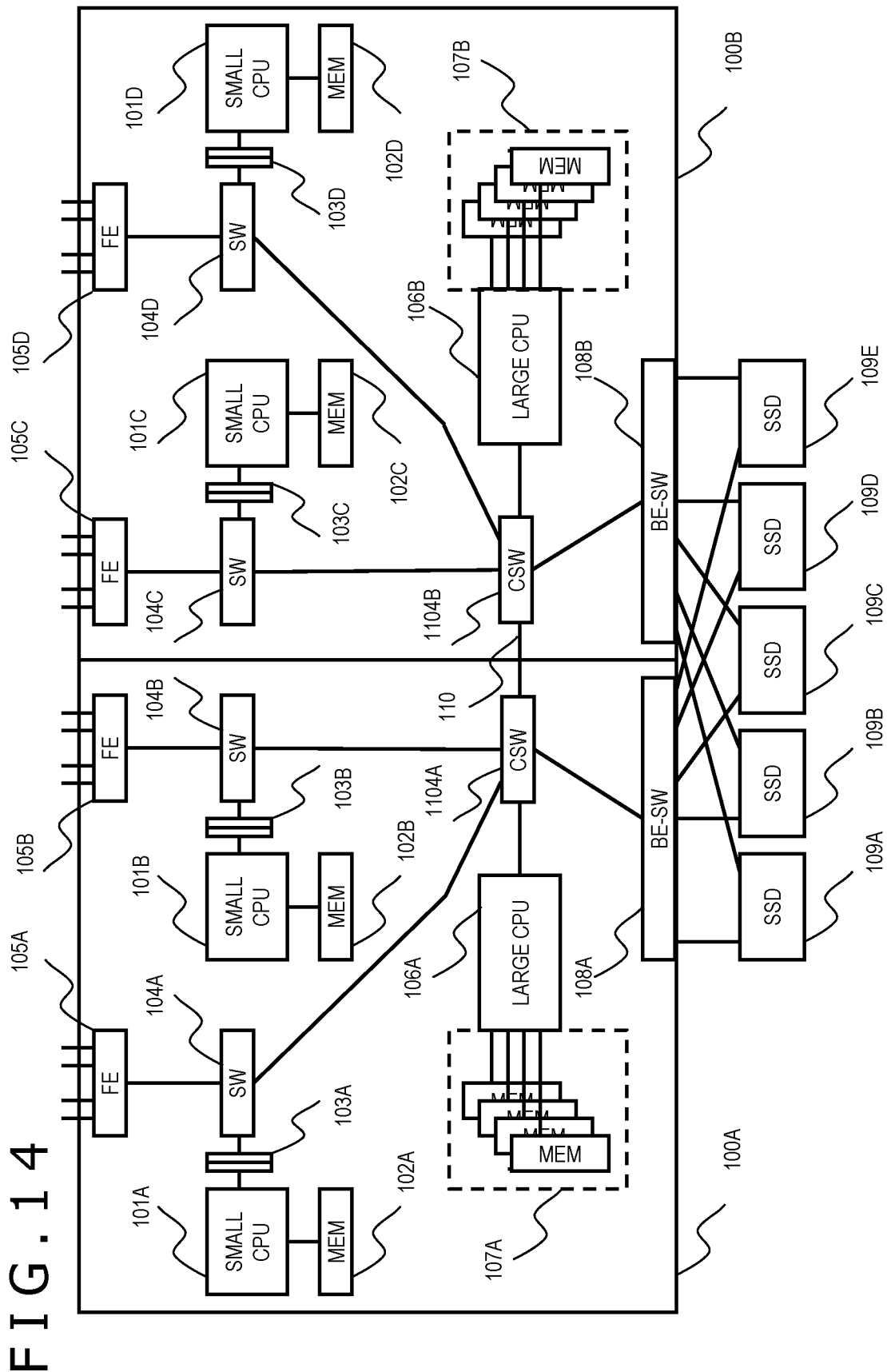
FIG. 14 illustrates a fifth configuration example of the storage system.

FIG. 14 is a diagram illustrating a configuration example of the storage system according to the embodiment. Differences from the configuration example in FIG. 1 will mainly be described below. Note that components with reference signs identical to those in FIG. 1 are of identical types but may execute different types of processing. The storage system includes central switches (CSW) 1104A and 1104B. The central switch 1104A is connected to the switches 104A and 104B, the large CPU 106A, and the backend switch 108A. The central switch 1104B is connected to the switches 104C and 104D, the large CPU 106B, and the backend switch 108B. Additionally, the central switches 1104A and 1104B are connected to each other by the path 110.

The central switch 1104A is connected to the switches 104A and 104B and thus connected to the buffer management units 103A and 103B via the switches 104A and 104B and also connected to the small CPUs 101A and 101B via the buffer management units 103A and 103B. The central switch 1104A allows exchange of various kinds of data and control commands among the SSDs 109A to 109E and the small CPUs 101A, 101B, and the large CPU 106A via the backend switch 108A. The central switch 1104B is connected to the switches 104C and 104D and thus connected to the buffer management units 103C and 103D via the switches 104C and 104D and also connected to the small CPUs 101C and 101D via the buffer management units 103A and 103B. The central switch 1104B allows exchange of various kinds of data and control commands among the SSDs 109A to 109E and the small CPUs 101C, 101D, and the large CPU 106B via the backend switch 108B.

Processing for the read command from the host computer will be described with reference to FIG. 15. An example will be described in which read data is read from the storage device and transferred to the host computer. The frontend interface 105A receives the read command from the host computer, and stores the read command in the memory 102A via the switch 104A, the buffer management unit 103A, and the memory control circuit of the small CPU 101A. As is the case with FIG. 4, for example, a queue region is set on the memory 102A in advance, and the read command received from the host computer is stored in the queue region. Further, the small CPU 101A acquires the read command from the queue region on the memory 102A, and analyzes the read command (1201).

In accordance with the result of analysis of the read command from the host computer, the small CPU 101A specifies one of the SSDs 109A to 109E corresponding to the logical volume number specified by the read command and the block address in the logical volume, determines the block address in the SSD 109, and transmits the SSD read command to the SSD 109 via the buffer management unit 103A, the switch 104A, the central switch 1104A, and the backend switch 108A (1202). In this case, the result data read from the SSD 109 by the SSD read command is specified to be stored not in the memory 102A connected to the small CPU 101A but in the memory 107A connected to the large CPU 106A. An example of an SSD command that can make such specification is an SSD command complying with the NVMe protocol. Note that, as is the case with FIG. 4, the SSD read command may be transmitted directly from the small CPU 101A to the SSD 109 as illustrated in FIG. 15, or the SSD read command may be temporarily stored in a queue region set on the memory 102A, and the SSD 109 may retrieve the SSD read command from the queue region on the memory 102A.

In response to reception of the SSD read command, in accordance with the specification of the SSD read command, the SSD 109 transmits specified SSD read data to the large CPU 106A via the backend switch 108A and the central switch 1104A (1203). The large CPU 106A stores, in the memory 107A, the SSD read data transmitted from the SSD 109. The storing the SSD read data in the memory 107A may be executed by one of the processor cores on the large CPU 106A by controlling the memory control circuit, or may be directly executed by the memory control circuit on the large CPU 106A without the intervention of the processor cores.

The SSD 109 transmits the SSD read data to the large CPU 106A, and then transmits a data read completion notification to the small CPU 101A via the backend switch 108A, the central switch 1104A, the switch 104A, and the buffer management unit 103A (1204). An example of an SSD command that can transmit a data read completion notification as described above is an SSD command complying with the NVMe protocol.

The small CPU 101A receives the data read completion notification, and then transmits a data conversion request for the SSD read data to the large CPU 106A via the buffer management unit 103A, the switch 104A, and the central switch 1104A (1205). In response to reception of the data conversion request, the large CPU 106A reads target SSD read data from the memory 107A (1206). Then, the large CPU 106A performs predetermined data conversion and writes converted data to the memory 107A (1207). Instead of being performed by the large CPU 106A, the predetermined data conversion may be performed by an accelerator added to the large CPU 106A, the accelerator being not illustrated. Further, once the write of the converted data to the memory 107A is complete, the large CPU 106A transmits a conversion completion notification to the small CPU 101A via the central switch 1104A, the switch 104A, and the buffer management unit 103A (1208).

In response to the conversion completion notification, the small CPU 101A stores, in the memory 102A, an FE data ready notification notifying the frontend interface 105A that read data (converted data) has been prepared. For such notification to the frontend interface 105A as well, as in the case of FIG. 4, a queue region may be set on the memory 102A in advance, and the notification may be stored in the queue region, as is the case with the read command received from the host computer. The frontend interface 105A acquires the FE data ready notification from the queue region on the memory 102A via the switch 104A and the buffer management unit 103A (1209).

In response to the FE data ready notification, the frontend interface 105A transmits a data read command to the large CPU 106A via the switch 104A and the central switch 1104A (1210). In response to the data read command, the large CPU 106A reads specified data from the memory 107A (1211), and returns the read data read out to the frontend interface 105A via the central switch 1104A and the switch 104A (1212). The processing for the data read command may also be executed by one of the processor cores of the large CPU 106A by controlling the memory control circuit, or may be directly executed by the memory control circuit on the large CPU 106A without the intervention of the processor cores. The frontend interface 105A returns the read data received to the host computer.

Figure 16:
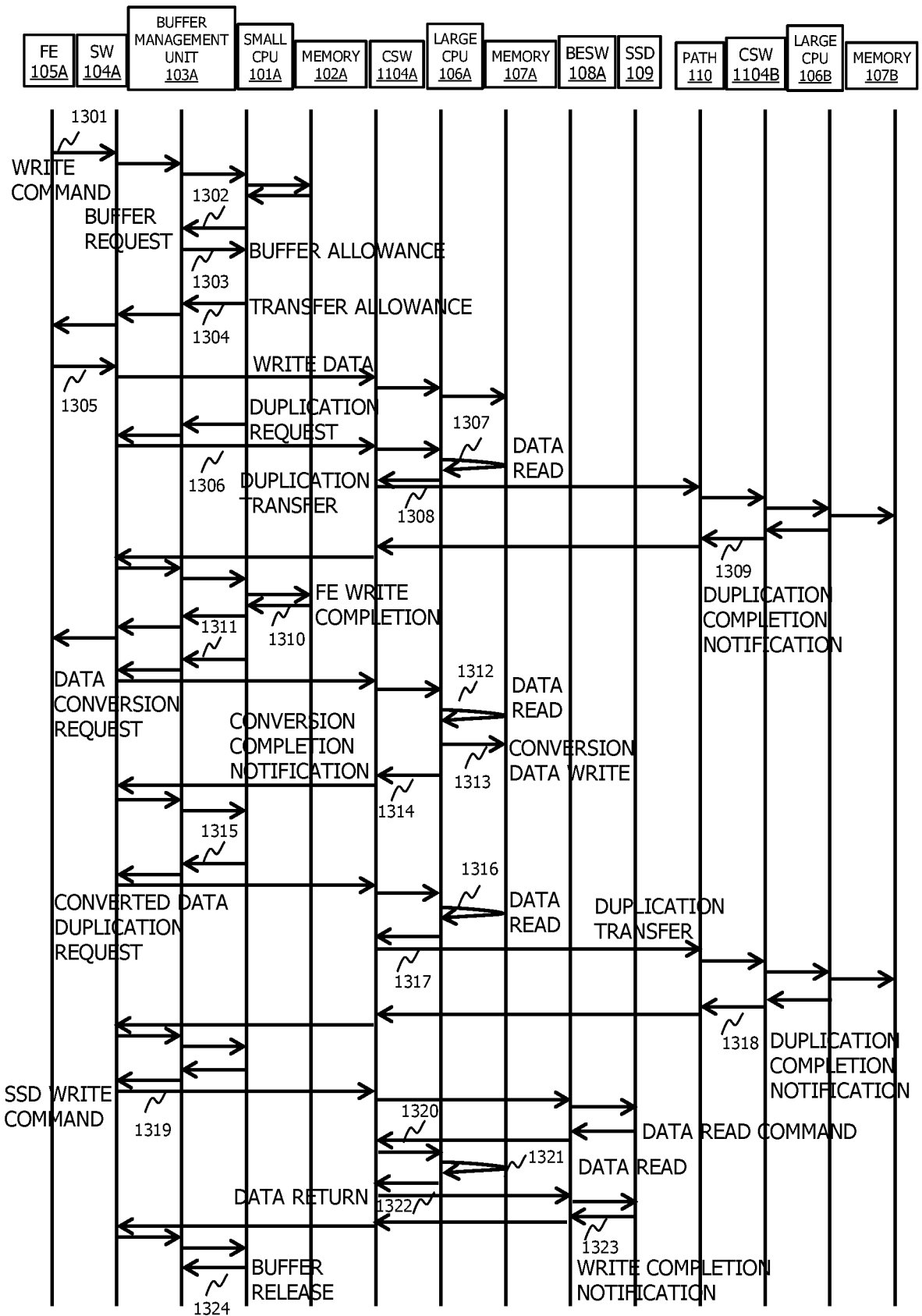
FIG. 16 illustrates an example of a processing sequence of write commands in the fifth configuration example.

Now, an example of write processing for the write command from the host computer will be described. FIG. 16 is a sequence diagram illustrating an example of write processing by the storage controller 100A. The write processing includes receiving the write command and host data (write data) from the host computer and storing the write data at a block address in the storage drive corresponding to the logical volume number specified by the write command and the block address in the logical volume.

The frontend interface 105A receives the write command from the host computer. The frontend interface 105A stores the write command in the memory 102A via the switch 104A, the buffer management unit 103A, and the memory control circuit of the small CPU 101A. For example, as is the case with the read command transmitted from the host computer, a queue region is set on the memory 102A in advance, and the write command received from the host computer is stored in the queue region. Further, the small CPU 101A acquires the write command from the queue region on the memory 102A, and analyzes the write command (1301).

In accordance with the result of analysis of the write command, the small CPU 101A determines a buffer size required to receive write data from the host computer, and transmits, to the buffer management unit 103A, a buffer request specifying the buffer size (1302). The buffer management unit 103A is assigned by the large CPU 106A a buffer region in the memory 107A that can be used as a buffer, and manages the buffer region. The buffer management unit 103A assigns an empty region in the buffer region as a memory region for the buffer request, and returns, to the small CPU 101A, a buffer allowance specifying the address of the memory region (1303).

In response to the buffer allowance, the small CPU 101A transmits, to the frontend interface 105A, a transfer allowance specifying the address of the memory region acquired (1304). The frontend interface 105A notifies the host computer that the frontend interface 105A is ready to receive data, and receives the write data from the host computer. The frontend interface 105A transmits the write data received to the large CPU 106A via the switch 104 and the central switch 1104A along with the address of the memory region specified by the transfer allowance (1304). The large CPU 106A stores the write data at the specified address in the memory 107A (1305). The storing the write data in the memory 107A may also be executed by one of the processor cores on the large CPU 106A by controlling the memory control circuit as is the case with FIG. 5, or may be directly executed by the memory control circuit on the large CPU 106A without the intervention of the processor cores.

The small CPU 101A transmits a duplication request for the write data to the large CPU 106A via the buffer management unit 103A, the switch 104A, and the central switch 1104A (1306). In response to the duplication request, the large CPU 106A reads, from the buffer region in the memory 107A, write data of the target to be duplicated (1307), and transfers the write data to the large CPU 106B of the other storage controller 100B via the central switch 1104A, the path 110, and the central switch 1104B as duplicate transfer. The reading the write data from the memory 107A may also be executed by one of the processor cores on the large CPU 106A by controlling the memory control circuit as is the case with FIG. 5, or may be directly executed by the memory control circuit on the large CPU 106A without the intervention of the processor cores. The large CPU 106B stores the data received in the memory 107B (1308). The storing the write data in the memory 107B may also be executed by one of the processor cores on the large CPU 106B by controlling the memory control circuit, or may be directly executed by the memory control circuit on the large CPU 106B without the intervention of the processor cores. Accordingly, even in a case where the memory 107A or 107B is inaccessible, the write data can be retrieved from the other memory, thus enabling a reduction in the possibility of loss of the write data due to any defect.

The large CPU 106B returns a duplication completion notification to the small CPU 101A via the central switch 1104B, the path 110, the central switch 1104A, the switch 104A, and the buffer management unit 103A (1309).

In response to the duplication completion notification from the large CPU 106B, the small CPU 101A stores, in the memory 102A, an FE write completion notification notifying the frontend interface 105A that the processing for storing the write data is complete. For such notification to the frontend interface 105A as well, a queue region may be set on the memory 102A in advance, and the notification may be stored in the queue region, as is the case with the write command received from the host computer. The frontend interface 105A acquires the FE write completion notification from the queue region on the memory 102A via the switch 104A and the buffer management unit 103A (1310). In response to the acquisition of the FE write completion notification, the frontend interface 105A returns a write completion notification to the host computer.

Then, the small CPU 101A transmits a data conversion request to the large CPU 106A via the buffer management unit 103A, the switch 104A, and the central switch 1104A (1311). In response to reception of the data conversion request, the large CPU 106A reads target write data from the memory 107A (1312). Then, the large CPU 106A performs predetermined data conversion to write converted data to the memory 107A (1313). Instead of being performed by the large CPU 106A, the predetermined data conversion may be performed by an accelerator added to the large CPU 106A, the accelerator being not illustrated. Further, once the write of the converted data to the memory 107A is complete, the large CPU 106A transmits a conversion completion notification to the small CPU 101A via the central switch 1104A, the switch 104A, and the buffer management unit 103A (1314).

In response to the conversion completion notification, the small CPU 101A transmits a duplication request for the converted data to the large CPU 106A via the buffer management unit 103A, the switch 104A, and the central switch 1104A (1315). In response to the duplication request, the large CPU 106A reads, from the memory 107A, converted data of the target to be duplicated (1316), and transfers the converted data to the large CPU 106B of the other storage controller 100B via the central switch 1104A, the path 110, and the central switch 1104B as duplicate transfer. The reading the converted data from the memory 107A may also be executed by one of the processor cores on the large CPU 106A by controlling the memory control circuit, or may be directly executed by the memory control circuit on the large CPU 106A without the intervention of the processor cores. The large CPU 106B stores the data received in the memory 107B (1317). The storing the converted data in the memory 107B may also be executed by one of the processor cores on the large CPU 106B by controlling the memory control circuit, or may be directly executed by the memory control circuit on the large CPU 106B without the intervention of the processor cores. Accordingly, even in a case where the memory 107A or 107B is inaccessible due to any defect, the converted data can be retrieved from the other memory, thus enabling a reduction in the possibility of loss of the converted data.

The large CPU 106B returns a duplication completion notification to the small CPU 101A via the central switch 1104B, the path 110, the central switch 1104A, the switch 104A, and the buffer management unit 103A (1318).

Then, in response to the duplication completion notification, the small CPU 101A transmits an SSD write command to the SSD 109 via the buffer management unit 103A, the switch 104A, the central switch 1104A, and the backend switch 108A (1319). At this time, the converted write data (SSD write data) written to the SSD 109 by the SSD write command is specified to be read directly from the memory 107A connected to the large CPU 106A. An example of an SSD command that can be specified as described above is an SSD command complying with the NVMe protocol. Note that, as is the case with FIG. 15, the SSD write command may be transmitted directly from the small CPU 101A to the SSD 109 as illustrated in FIG. 16, or the SSD write command may be temporarily stored in a queue region set on the memory 102A, and the SSD 109 may retrieve the SSD write command from the queue region on the memory 102A.

In response to reception of the SSD write command, the SSD 109 transmits a data read command for reading specified SSD write data, to the large CPU 106A via the backend switch 108A and the central switch 1104A in accordance with the specification in the SSD write command (1320). In accordance with the data read command transmitted from the SSD 109, the large CPU 106A reads the SSD write data from the memory 107A (1321), and returns the SSD write data to the SSD 109 (1322). The reading the SSD write data from the memory 107A and the return of the SSD write data to the SSD 109 may also be executed by one of the processor cores on the large CPU 106A by controlling the memory control circuit, or may be directly executed by the memory control circuit on the large CPU 106A without the intervention of the processor cores.

In response to reception of the SSD write data from the large CPU 106A, the SSD 109 writes the SSD write data received into the SSD 109, and transmits a write completion notification to the small CPU 101A via the backend switch 108A, the central switch 1104A, the switch 104A, and the buffer management unit 103A (1323). An example of an SSD command that can send the write completion notification as described above is an SSD command complying with the NVMe protocol.

In response to the write completion notification, the small CPU 101A transmits, to the buffer management unit 103A, a request to release the memory region used for the current write command (1324). In response to the request to release the memory region, the buffer management unit 103A releases the specified memory region such that the memory region can be used for new write processing again.

Figure 15:
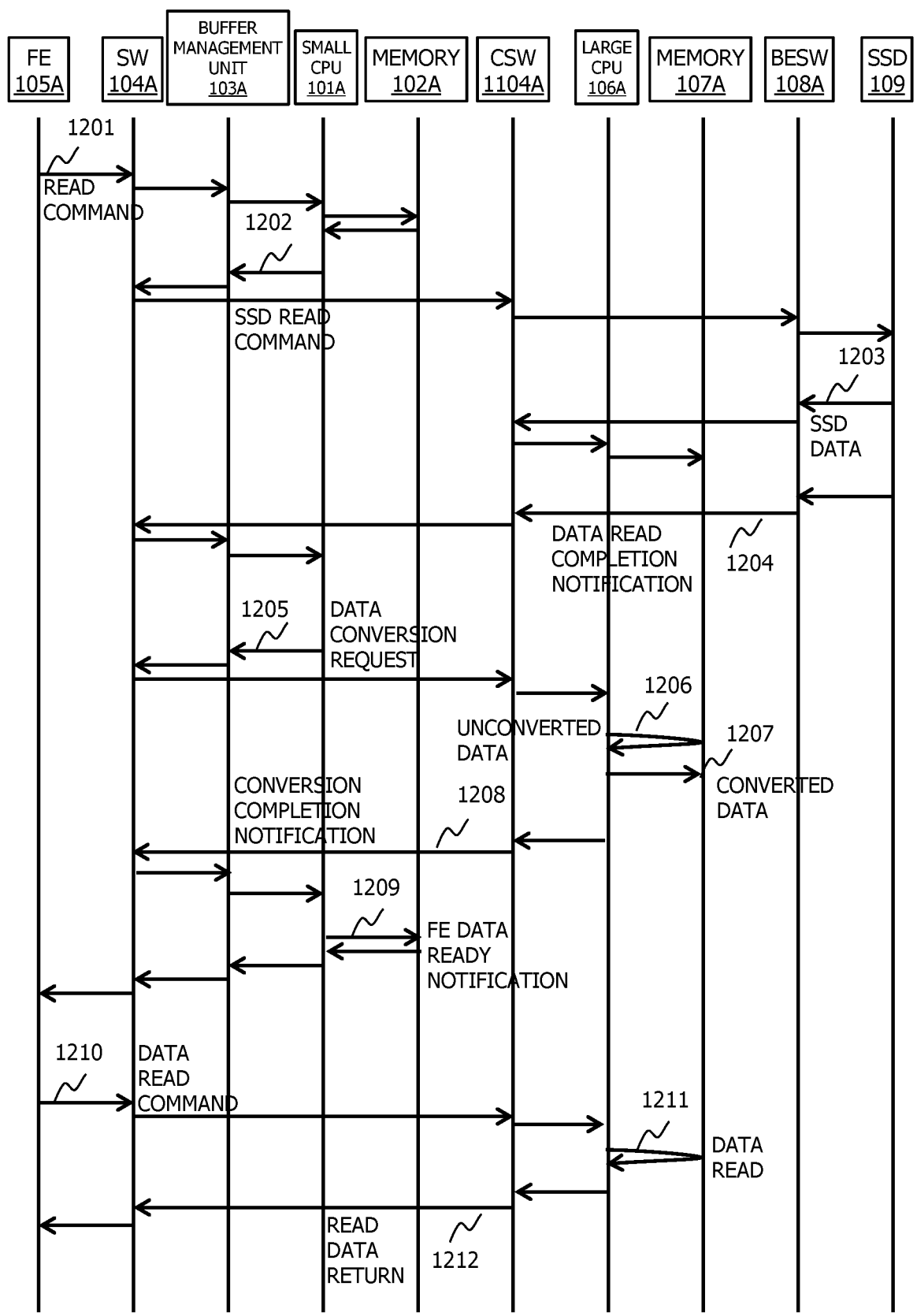
FIG. 15 illustrates an example of a processing sequence of read commands in the fifth configuration example.

The processing described with reference to FIGS. 15 and 16 is also executed in the frontend interface 105B, the small CPU 101B, the memory 102B, the buffer management unit 103B, the switch 104B, the central switch 1104A, the large CPU 106A, the backend switch 108A, and the SSD 109. This also applies to the storage controller 100B.

Note that the present invention is not limited to the embodiments described above and includes various modified examples. For example, the embodiments described above are detailed descriptions for describing the present invention in an easy-to-understand manner, and are not necessarily limited to the configuration including all the components described. Additionally, a part of the configuration of one embodiment can be replaced with the configuration of another embodiment, and the configuration of one embodiment can be added to the configuration of another embodiment. Additionally, a part of the configuration of each embodiment may be subjected to addition, deletion, and replacement of another configuration.

Additionally, the configurations, functions, processing units, and the like described above may be implemented using hardware and by, for example, designing using an integrated circuit, or the like. In addition, the configurations, functions, and the like described above may be implemented using software and by a processor interpreting and executing programs realizing the respective functions. Information such as programs, tables, and files for implementing the functions can be placed in a recording apparatus such as a memory, a hard disk, or an SSD, or a recording medium such as an integrated circuit (IC) card or a secure digital (SD) card.

Additionally, control lines and information lines illustrated are considered necessary for description, and not all the control lines and information lines in the product are illustrated. In actuality, substantially all the components may be considered to be interconnected.

What is claimed is:

1. A storage system in communication with a host computer, the storage system comprising:
a first processor;
a first memory connected to the first processor;
a second processor;
a second memory connected to the second processor; and
one or more storage drives, wherein
a bandwidth between the second processor and the second memory is higher than a bandwidth between the first processor and the first memory,
the first memory stores a read command originating from the host computer,
the first processor analyzes a content of the read command, and in accordance with a result of the read command analysis, transmits a request associated with the read command to the second processor,
in accordance with the request from the first processor, the second processor reads the read data from the one or more storage drives and stores the read data in the second memory,
the second processor notifies the first processor that the read data is stored in the second memory, and
the first processor transmits the read data read from the second memory to the host computer without storing the read data in the first memory.

2. The storage system according to claim 1, wherein
the first memory stores a write command originating from the host computer,
the first processor analyzes the write command, and in accordance with a result of the write command analysis, reserves a region on the second memory,
the first processor stores write data transmitted by the host computer in the region on the second memory without storing the write data in the first memory, and requests the second processor to execute processing on the write data stored in the region on the second memory, and
the second processor stores the write data stored in the second memory, in the one or more storage drives in response to the request from the first processor.

3. The storage system according to claim 2, further comprising:
a buffer management unit connected to the first processor, wherein
the first processor requests the buffer management unit to reserve the region on the second memory, and,
in response to the request from the first processor, the buffer management unit reserves the region on the second memory.

4. The storage system according to claim 2, further comprising:
a third processor; and
a third memory connected to the third processor, wherein
a bandwidth between the third processor and the third memory is higher than the bandwidth between the first processor and the first memory,
the first processor transmits, to the second processor, a duplication request for the write data stored in the second memory,
in response to the duplication request, the second processor transmits, to the third processor, the write data stored in the second memory,
the third processor stores the write data in the third memory, and
the third processor notifies the first processor that the write data is stored in the third memory.

5. The storage system according to claim 1, further comprising:
a data conversion unit, wherein
the first processor requests the data conversion unit to perform data conversion on the read data stored in the second memory,
in response to the request from the first processor, the data conversion unit converts the read data read from the second memory, and stores the read data converted in the second memory, and
the first processor transmits the read data converted and stored in the second memory, to the host computer without storing the read data in the first memory.

6. The storage system according to claim 5, wherein the data conversion of the data conversion unit is processing for decompressing compressed data.

7. The storage system according to claim 2, further comprising:
a data conversion unit, wherein
the first processor requests the data conversion unit to perform data conversion on the write data stored in the second memory,
in response to the request from the first processor, the data conversion unit converts the write data read from the second memory, and stores the write data converted in the second memory, and
the second processor stores the write data converted by the data conversion unit and stored in the second memory, in the one or more storage drives in response to the request from the first processor.

8. The storage system according to claim 7, wherein the data conversion of the data conversion unit is processing for compressing data.

9. The storage system according to claim 1, further comprising:
a fourth processor;
a fourth memory connected to the fourth processor; and
a router, wherein
a bandwidth between the fourth processor and the fourth memory is higher than the bandwidth between the first processor and the first memory,
the first memory stores a write command originating from the host computer,
the first processor analyzes the write command, and in accordance with a result of the write command analysis, reserves a region on the second memory and a region on the fourth memory, the router stores write data transmitted by the host computer, in the respective regions reserved in the second memory and the fourth memory without storing the write data in the first memory, and the second processor or the fourth processor stores the write data stored in the second memory or the fourth memory, in the one or more storage drives in response to the request from the first processor.

10. The storage system according to claim 9, further comprising:
a data conversion unit, wherein
the first processor requests the data conversion unit to perform data conversion,
in response to the request from the first processor, the data conversion unit converts the write data on the second memory or the fourth memory, and stores the write data converted in the second memory or the fourth memory, and
the second processor or the fourth processor stores the write data converted by the data conversion unit and stored in the second memory or the fourth memory, in the one or more storage drives in response to the request from the first processor.

11. A storage system in communication with a host computer, the storage system comprising:
a first processor;
a first memory connected to the first processor;
a second processor;
a second memory connected to the second processor; and
one or more storage drives, wherein
a bandwidth between the second processor and the second memory is higher than a bandwidth between the first processor and the first memory,
the first memory stores a read command originating from the host computer,
the first processor analyzes a content of the read command, reads, from the one or more storage drives, read data corresponding to the read command in accordance with a result of the read command analysis, stores the read data in the second memory without storing the read data in the first memory, and requests the second processor to execute first processing on the read data stored in the second memory, in response to the request from the first processor, the second processor reads the read data from the second memory, executes the first processing, and stores a result of execution of the first processing in the second memory, and the first processor reads the read data or the result of execution of the first processing on the read data stored in the second memory, and transmits the read data or the result of the execution of the first processing to the host computer without storing the read data or the result of execution of the first processing on the read data in the first memory.

12. The storage system according to claim 11, wherein
the first memory stores a write command originating from the host computer,
the first processor analyzes the write command, and in accordance with a result of the write command analysis, reserves a region on the second memory,
the first processor stores write data transmitted by the host computer in the region on the second memory without storing the write data in the first memory, and requests the second processor to execute second processing on the write data stored in the second memory,
in response to the request from the first processor, the second processor reads the write data from the second memory, executes the second processing, and stores a result of execution of the second processing in the second memory, and
the first processor stores the write data or the result of execution of the second processing on the write data stored in the second memory, in the one or more storage drives without storing the write data or the result of execution of the second processing on the write data in the first memory.

* * * * *